US012508820B2

(12) United States Patent
Jeong et al.

(10) Patent No.: US 12,508,820 B2
(45) Date of Patent: Dec. 30, 2025

(54) PORTABLE PRINTER AND PORTABLE PRINTING SYSTEM

(71) Applicant: LG H&H CO., LTD., Seoul (KR)

(72) Inventors: Hee Seon Jeong, Seoul (KR); Jung Yong Lee, Seoul (KR); Chang Hwan Hyun, Seoul (KR)

(73) Assignee: LG H&H CO., LTD., Seoul (KR)

(*) Notice: Subject to any disclaimer, the term of this patent is extended or adjusted under 35 U.S.C. 154(b) by 66 days.

(21) Appl. No.: 18/282,442

(22) PCT Filed: Feb. 3, 2023

(86) PCT No.: PCT/KR2023/001604
§ 371 (c)(1),
(2) Date: Sep. 15, 2023

(87) PCT Pub. No.: WO2023/153729
PCT Pub. Date: Aug. 17, 2023

(65) Prior Publication Data
US 2024/0157708 A1 May 16, 2024

(30) Foreign Application Priority Data
Feb. 9, 2022 (KR) ........................ 10-2022-0017075
Sep. 15, 2022 (KR) ........................ 10-2022-0116407
(Continued)

(51) Int. Cl.
*B41J 3/36* (2006.01)
*B41J 2/045* (2006.01)
(Continued)

(52) U.S. Cl.
CPC ............. *B41J 3/36* (2013.01); *B41J 2/04551* (2013.01); *B41J 2/04556* (2013.01);
(Continued)

(58) Field of Classification Search
CPC ............... B41J 3/36; B41J 3/39; B41J 2/2125
See application file for complete search history.

(56) References Cited

U.S. PATENT DOCUMENTS 5,988,900 A 11/1999 Bobry
6,070,962 A 6/2000 Kinoshita
(Continued)

FOREIGN PATENT DOCUMENTS

CN 216059017 U 3/2022
CN 114794204 A 7/2022
(Continued)

OTHER PUBLICATIONS

Ohashi, MachineTranslationofJP-2023020119-A, 2023 (Year: 2023).*
Extended European Search Report for European Application No. 22887490.5, dated Oct. 1, 2025.

*Primary Examiner* — Scott A Richmond
(74) *Attorney, Agent, or Firm* — Birch, Stewart, Kolasch & Birch, LLP

(57) ABSTRACT

The present disclosure relates to a portable printer and a portable printing system including: a main body in a portable form configured to accommodate a cartridge including a nozzle that prints an image by delivering a printing material to a target having a soft or hard surface; a seating part that is provided to be exposed to an outside from a lower portion of the main body to face a surface of the target and surrounds the nozzle at least partially; a roller provided at each of the front and rear of the nozzle at the lower portion of the main body, based on a direction in which the main body moves along the surface of the target to deliver the printing material to the target; and a magnetic body configured to rotate in correspondence with rotation of the roller.

10 Claims, 20 Drawing Sheets

1

(30) Foreign Application Priority Data

Oct. 12, 2022 (KR) ........................ 10-2022-0130679
Dec. 27, 2022 (KR) ........................ 10-2022-0185618

(51) Int. Cl.
*B41J 2/145* (2006.01)
*B41J 2/21* (2006.01)
*B41J 3/39* (2006.01)
*B41J 3/407* (2006.01)

(52) U.S. Cl.
CPC ........... *B41J 2/04586* (2013.01); *B41J 2/145* (2013.01); *B41J 3/4073* (2013.01)

(56) References Cited

U.S. PATENT DOCUMENTS

| | | | |
|---|---|---|---|
| 6,543,893 | B2 | 4/2003 | Desormeaux |
| 9,259,933 | B1 | 2/2016 | Fima |
| 9,555,645 | B1 | 1/2017 | Mealy et al. |
| 2002/0070988 | A1 | 6/2002 | Desormeaux |
| 2004/0240923 | A1 | 12/2004 | Warrin et al. |
| 2004/0246327 | A1 | 12/2004 | Elzi |
| 2006/0192798 | A1 | 8/2006 | Kuki et al. |
| 2018/0050544 | A1* | 2/2018 | Suzuki ................... B41J 19/147 |
| 2019/0283452 | A1 | 9/2019 | Nishii et al. |
| 2020/0101763 | A1* | 4/2020 | Ishida .................. B41J 2/17526 |
| 2020/0171831 | A1 | 6/2020 | Lee et al. |
| 2023/0036021 | A1* | 2/2023 | Ohashi ....................... B41J 3/36 |

FOREIGN PATENT DOCUMENTS

| | | | | |
|---|---|---|---|---|
| JP | 2006-272612 | A | 10/2006 | |
| JP | 2006-297691 | A | 11/2006 | |
| JP | 2010-520822 | A | 6/2010 | |
| JP | 4626069 | B2 | 2/2011 | |
| JP | 5154839 | B2 | 2/2013 | |
| JP | 2017-71135 | A | 4/2017 | |
| JP | 2020-116807 | A | 8/2020 | |
| JP | 2021-84312 | A | 6/2021 | |
| JP | 2021-151773 | A | 9/2021 | |
| JP | 6996195 | B2 | 1/2022 | |
| JP | 2023020119 | A * | 2/2023 | .......... B41J 11/0095 |
| KR | 10-2004-0002099 | A | 1/2004 | |
| KR | 10-2006-0002097 | A1 | 1/2006 | |
| KR | 10-0590571 | B1 | 6/2006 | |
| KR | 10-2016-0064616 | A | 6/2016 | |
| KR | 10-1655978 | B1 | 9/2016 | |
| KR | 10-2017-0105391 | A | 9/2017 | |
| KR | 10-1774412 | B1 | 9/2017 | |
| KR | 10-1783314 | B1 | 10/2017 | |
| KR | 10-1789666 | B1 | 10/2017 | |
| KR | 10-1802662 | B1 | 11/2017 | |
| KR | 10-1822882 | B1 | 1/2018 | |
| KR | 10-1822883 | B1 | 1/2018 | |
| KR | 10-1827267 | B1 | 2/2018 | |
| KR | 10-1827268 | B1 | 2/2018 | |
| KR | 10-1865605 | B1 | 6/2018 | |
| KR | 10-1865665 | B1 | 6/2018 | |
| KR | 10-1874256 | B1 | 7/2018 | |
| KR | 10-1892202 | B1 | 8/2018 | |
| KR | 10-1897512 | B1 | 9/2018 | |
| KR | 10-1898804 | B1 | 9/2018 | |
| KR | 10-1917907 | B1 | 11/2018 | |
| KR | 10-2009520 | B1 | 8/2019 | |
| KR | 10-2152998 | B1 | 9/2020 | |
| KR | 10-2023-0059614 | A | 5/2023 | |
| WO | WO 2021/169712 | A1 | 9/2021 | |

* cited by examiner

1

PORTABLE PRINTER AND PORTABLE PRINTING SYSTEM

CROSS-REFERENCE TO RELATED APPLICATIONS

This application is the National Phase of PCT International Application No. PCT/KR2023/001604, filed on Feb. 3, 2023, which claims priority under 35 U.S.C. § 119(a) to Patent Application No. 10-2022-0017075, filed in the Republic of Korea on Feb. 9, 2022, Patent Application No. 10-2022-0116407, filed in the Republic of Korea on Sep. 15, 2022, Patent Application No. 10-2022-0130679, filed in the Republic of Korea on Oct. 12, 2022 and Patent Application No. 10-2022-0185618, filed in the Republic of Korea on Dec. 27, 2022, all of which are hereby expressly incorporated by reference into the present application.

TECHNICAL FIELD

The present disclosure relates to a portable printer and a portable printing system.

BACKGROUND ART

In general, skin of a person's body forms the person's appearance, and the skin may be tattooed. For example, after applying tattoo ink to a tattoo needle, a practitioner may apply a tattoo by penetrating the tattoo needle into the skin. As the practitioner repeats this process, a specific pattern is tattooed on the skin.

Since the process of applying the ink to the needle and penetrating the skin is carried out over a long time, the tattoo treatment takes a long time, which may prolong the pain of the subject. In addition, since the tattoo is performed on the dermis of the subject, it is difficult to remove the tattoo once it is engraved, and the cost of the tattoo treatment may increase as the tattoo treatment time is prolonged.

As an alternative to solving the issues of tattoos, methods such as henna, body painting, and stickers are being used, and furthermore, research and development of printer products that can print specific designs on the skin are also being carried out.

In the case of a printer product, it has the advantage in that a user's desired image can be easily printed on the skin and various images can be used. However, since the skin is not flat, a gap between a nozzle of the printer product and the skin is not kept constant, which may cause many differences between the original image that the user wants to be printed and the image printed on the skin.

On the other hand, home inkjet printers are being used to print on paper and photo paper. In general, however, the home inkjet printers should use a specified size and type of paper.

Therefore, in order to perform printing regardless of the size or type of paper such as diaries, notebooks, and stickers, a portable printer with movable nozzles and rollers is required. This portable printer has a feature similar to a portable printer used for the skin in that it moves positions of the nozzle and roller to a place where the user wants to print. However, since the skin and paper have different properties such as soft and hard, respectively, there was an issue in that it was impossible to use the same roller and nozzle structures for both purposes.

In addition, when the user prints on the skin or the like using the portable printer, movement of the portable printer is not performed at a uniform speed, so there is a limit in that an issue such as distortion of a printed image or deterioration of sharpness of the printed image occurs.

DISCLOSURE OF THE INVENTION

Technical Goals

The present disclosure has been created to solve the issues of the related art as described above, and an object of the present disclosure is to provide a portable printer and a portable printing system capable of printing a clear image on skin by maintaining a constant distance between the skin and a nozzle.

Further, an object of the present disclosure is to provide a portable printer and a portable printing system capable of appropriately changing a distance between the nozzle and a surface of a target so that smooth printing is possible for both when the target on which a printing material is to be printed is soft, such as skin, and hard, such as paper.

Further, an object of the present disclosure is to provide a portable printer and a portable printing system capable of increasing printing clarity by detecting rotation of a roller, checking a traveling speed or traveling distance of the roller, and printing an image accordingly.

In addition, an object of the present disclosure is to provide a portable printer and a portable printing system capable of printing a clear image without smearing in any mode by recognizing a skin or paper mode through up and down sensing and adjusting the size of the nozzle for ejection accordingly.

Technical Solutions

In accordance with an aspect of the present disclosure, there is provided a portable printer including: a main body in a portable form configured to accommodate a cartridge including a nozzle that prints an image by delivering a printing material to a target having a soft or hard surface; a seating part that is provided to be exposed to an outside from a lower portion of the main body to face a surface of the target and surrounds the nozzle at least partially; a roller provided at each of the front and rear of the nozzle at the lower portion of the main body, based on a direction in which the main body moves along the surface of the target to deliver the printing material to the target; a magnetic body configured to rotate in correspondence with rotation of the roller; a sensing unit configured to detect a magnetic field according to the rotation of the magnetic body; and a controller configured to control the delivery of the printing material by the nozzle based on a sensing value of the sensing unit.

Specifically, the magnetic body may be provided on the roller or separately from the roller and rotates in conjunction with the rotation of the roller.

Specifically, the sensing unit may be configured to detect a rotation direction of the roller by detecting the magnetic field according to the rotation of the magnetic body, and the controller may be configured to stop the delivery of the printing material or transmit a notification signal when reverse rotation of the roller is detected by the sensing unit.

Specifically, the sensing unit may include an encoder sensor configured to convert a change in the magnetic field according to the rotation of the magnetic body into an electrical signal, and the controller may be configured to calculate at least a traveling distance of the roller among a traveling direction and the traveling distance of the roller based on the electrical signal converted by the sensing unit, and control the delivery of the printing material by the nozzle by a length of the image corresponding to the traveling distance of the roller.

Specifically, the controller may include: a control unit configured to receive the electrical signal of the encoder sensor and generate a printing signal; an imaging unit configured to generate printing data from the image based on the printing signal; and a printing unit configured to control the nozzle based on the printing signal and the printing data.

Specifically, the portable printer may further include a printing adjustment unit configured to adjust a height difference between the nozzle and the surface of the target by moving the roller in inner and outer directions of the main body to adjust a height difference between the nozzle and the roller.

Specifically, the printing adjustment unit may be configured to move the seating part in the inner and outer directions of the main body, and the roller may be configured to move integrally with the seating part.

Specifically, the portable printer may further include a mode detector configured to detect the height difference between the nozzle and the surface of the target by detecting a position of the seating part, and the mode detector may be configured to detect a first mode in which the nozzle and the surface of the target form a first height or a second mode in which the nozzle and the surface of the target form a second height greater than the first height according to the position of the seating part.

Specifically, the mode detector may include an interrupt sensor including a light emitter and a light receiver and configured to detect whether at least a portion of the seating part is placed or misaligned between the light emitter and the light receiver.

Specifically, a plurality of the nozzles may be provided and may include a first nozzle and a second nozzle of different sizes, a first nozzle and a second nozzle may be alternately arranged in a head of the cartridge, and the controller may be configured to variably control the nozzles through which the printing material is discharged according to the position of the seating part.

Specifically, a discharge hole of the first nozzle may be larger than a discharge hole of the second nozzle, and the controller may be configured to control the printing material to be delivered by the first nozzle and the second nozzle when the mode detector detects the first mode, and control the printing material to be delivered by the first nozzle when the mode detector detects the second mode.

In accordance with another aspect of the present disclosure, there is provided a portable printing system including: the portable printer; and a user terminal configured to communicate with the portable printer, wherein the portable printer further includes a communication unit configured to communicate with the user terminal and receive an image to be printed on the target; and a storage configured to store the image to be printed on the target.

Specifically, the controller of the portable printer may include: a control unit configured to receive the sensing value of the sensing unit and generate a printing signal; an imaging unit configured to generate printing data from the image based on the printing signal; and a printing unit configured to control the nozzle based on the printing signal and the printing data.

Specifically, the user terminal may be configured to receive target information input by a user or collect the target information from the target, and generate a corrected image based on the image to be printed on the target and the target information, the communication unit may be configured to receive the corrected image from the user terminal, and the imaging unit may be configured to generate the printing data based on the corrected image and the printing signal.

Specifically, the target information may include at least one of hardness of the target and color of the target.

Advantageous Effects

A portable printer and a portable printing system according to the present disclosure may print a clear image on the skin by maintaining a constant optimal distance between the skin and the nozzle.

In addition, the portable printer and the portable printing system according to the present disclosure may be able to appropriately change the distance between the nozzle and the surface of the target by adjusting a degree of protrusion of a head part, so that printing quality can be guaranteed even if hardness of the target is different and they can be used for both skin and paper.

In addition, the portable printer and the portable printing system according to the present disclosure may print a clear image on the target by properly controlling printing of the nozzle by detecting movement of the roller through a change in a magnetic field by a magnetic body rotating integrally with the roller.

In addition, the portable printer and the portable printing system according to the present disclosure may print a clear image without smearing in any mode by recognizing the skin or paper mode through up and down sensing and adjusting the size of the nozzle for ejection accordingly.

BEST MODE FOR CARRYING OUT THE INVENTION

Figure 1:
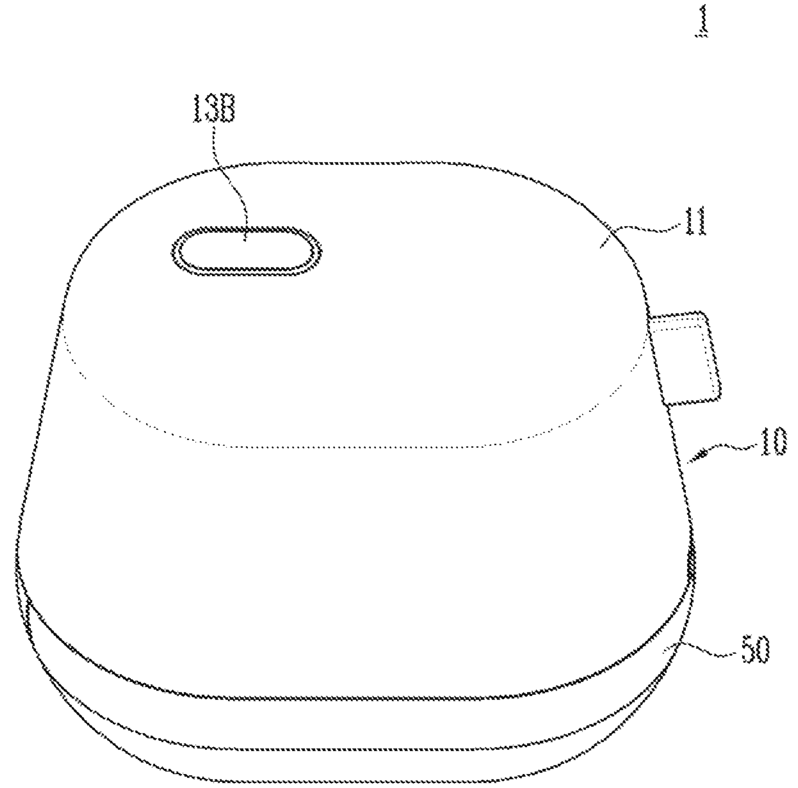
FIG. 1 is a perspective view of a portable printer according to a first embodiment of the present disclosure.

The objects, specific advantages and novel features of the present disclosure will become more apparent from the following detailed description and preferred embodiments taken in conjunction with the accompanying drawings. In the present specification, in adding reference numerals to components of each drawing, it should be noted that only the same components are given the same numeral as possible even though they are indicated on different drawings. In addition, in describing the present disclosure, if it is determined that a detailed description of a related known art may unnecessarily obscure the subject matter of the present invention, the detailed description thereof will be omitted.

For reference, a portable printer described herein may deliver a printing material to a target, and the target may have a soft or hard surface. For example, the target may be soft skin, hard paper, or the like (including base paper that can be attached to skin or nails).

In the portable printer according to the present disclosure, some components may be changed by movement or the like depending on the hardness of the target, and the meaning of soft or hard to be described later is relative. For example, in the present disclosure, a user's skin (regardless of location) may be defined as a soft target, and an object harder than the skin may be defined as a hard target. The target referred to as skin hereinafter is for convenience of description and can of course be interpreted as a target such as paper.

In addition, in the present disclosure, an image includes a letter, number, figure, pattern, or the like, or is a combination thereof and its shape, form, color, and the like are not limited. In addition, the image does not include only one consisting of colors identifiable with the naked eye, but also includes one consisting of colors identifiable only through special equipment.

Hereinafter, with reference to the accompanying drawings, preferred embodiments of the present disclosure will be described in detail.

Figure 2A:
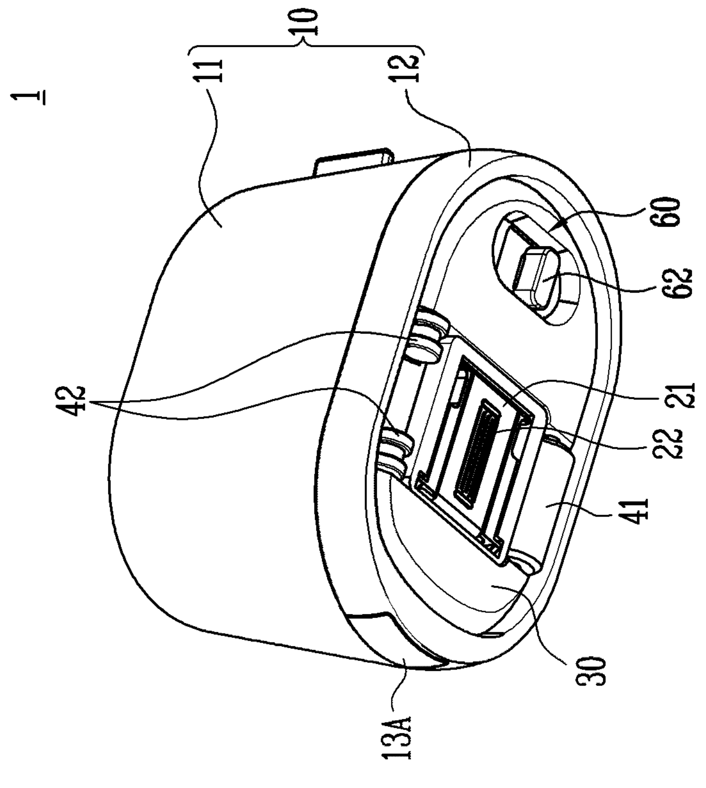
FIGS. 2A and 2B are perspective views of the portable printer according to the first embodiment of the present disclosure.
Figure 2B:
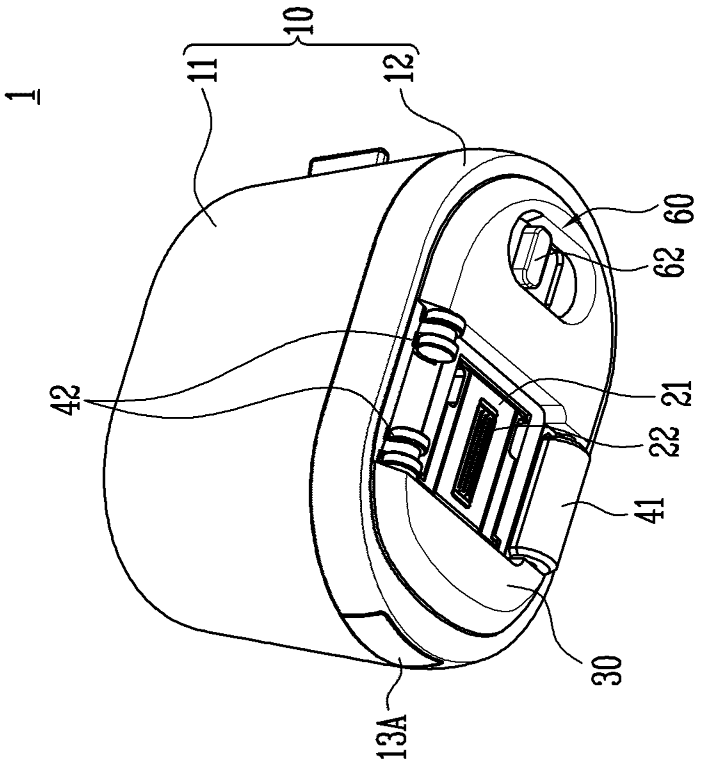
Figure 3:
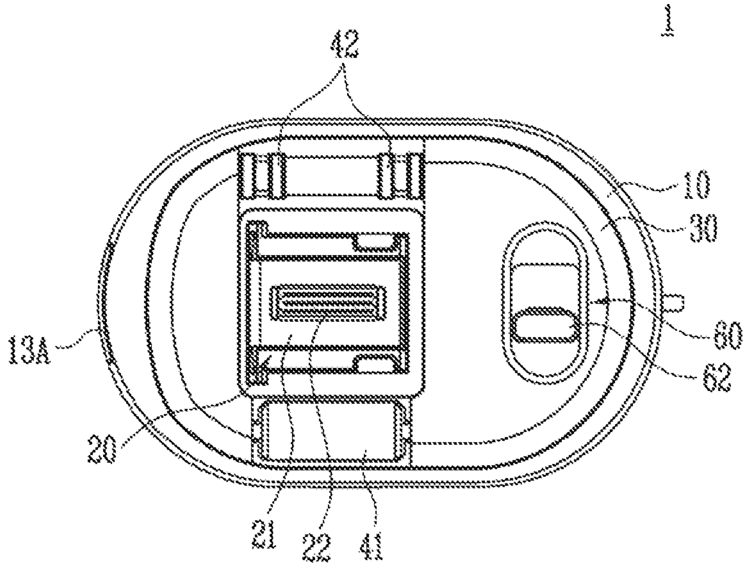
FIG. 3 is a bottom plan view of the portable printer according to the first embodiment of the present disclosure.
Figure 4A:
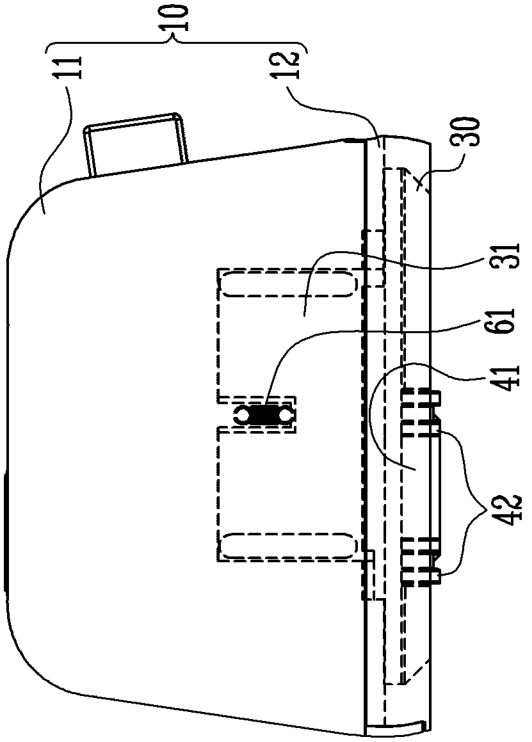
FIGS. 4A and 4B are side views of the portable printer according to the first embodiment of the present disclosure.
Figure 4B:
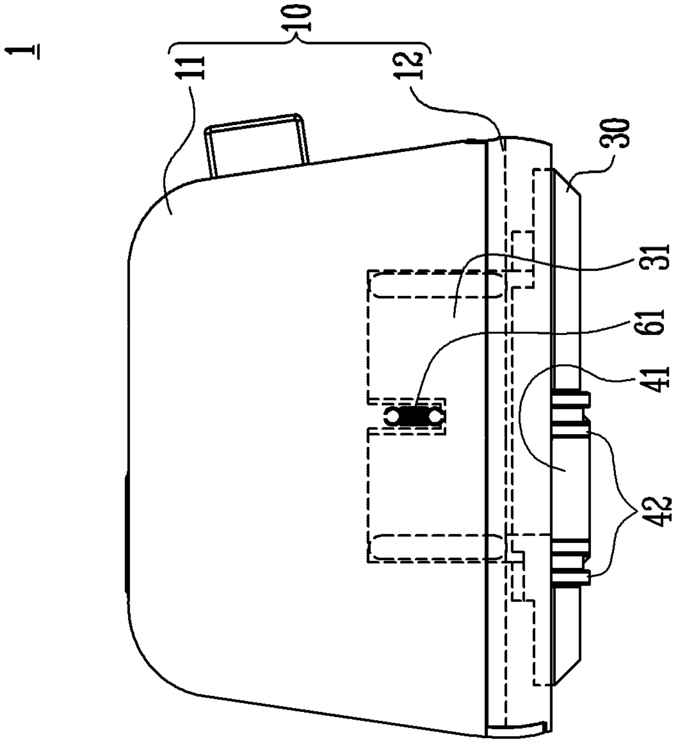

FIGS. 1, 2A and 2B are perspective views of a portable printer according to a first embodiment of the present disclosure, FIG. 3 is a bottom plan view of the portable printer according to the first embodiment of the present disclosure, and FIGS. 4A and 4B are side views of the portable printer according to the first embodiment of the present disclosure.

Figure 5:
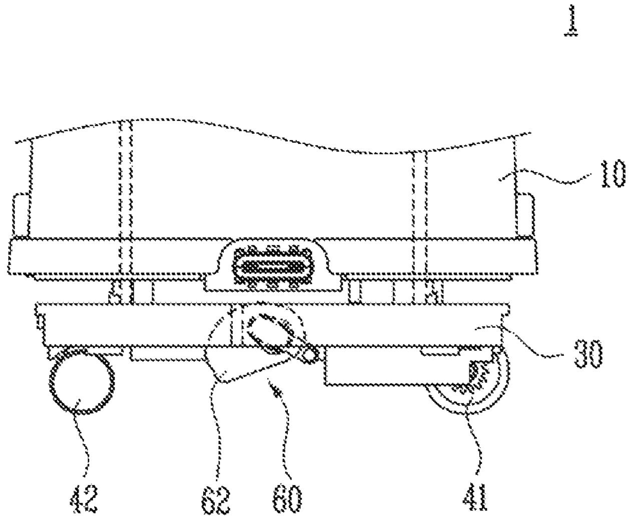
FIG. 5 is a side perspective view of the portable printer according to the first embodiment of the present disclosure.
Figures 6A, 6B:
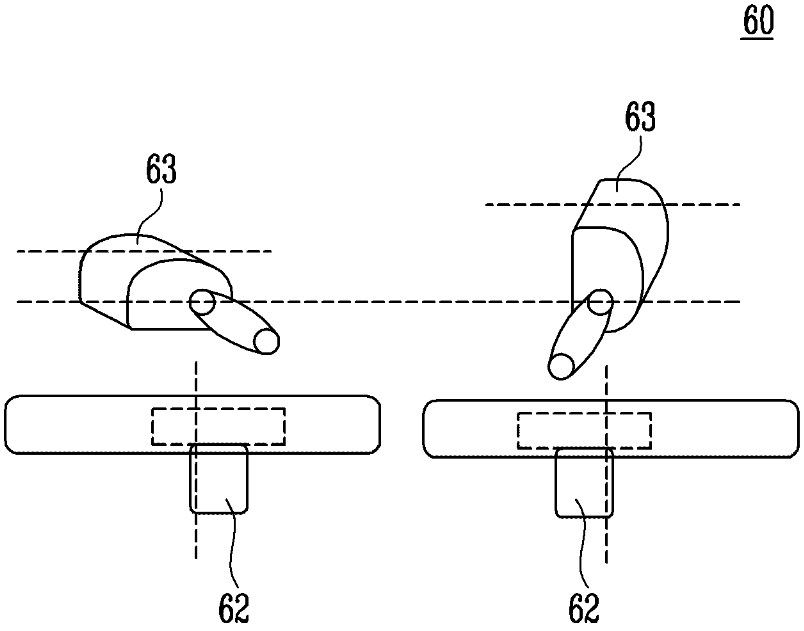
FIGS. 6A and 6B are schematic diagrams of the portable printer according to the first embodiment of the present disclosure.
Figure 7:
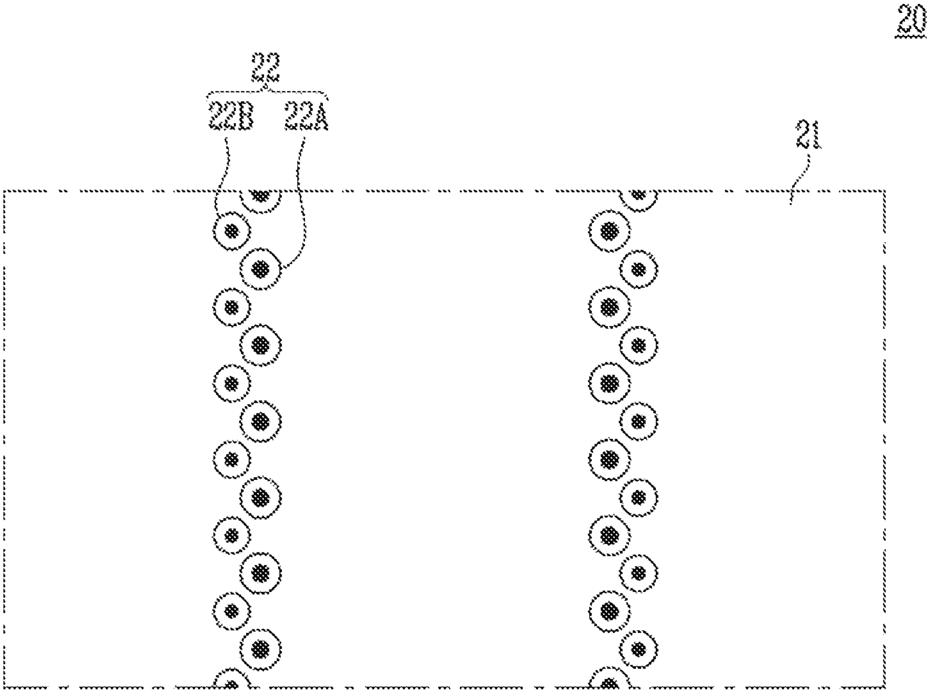
FIG. 7 is a plan view of a head of the portable printer according to the first embodiment of the present disclosure.

In addition, FIG. 5 is a side perspective view of the portable printer according to the first embodiment of the present disclosure, FIGS. 6A and 6B are schematic diagrams of the portable printer according to the first embodiment of the present disclosure, and FIG. 7 is a plan view of a head of the portable printer according to the first embodiment of the present disclosure.

Figures 8A, 8B:
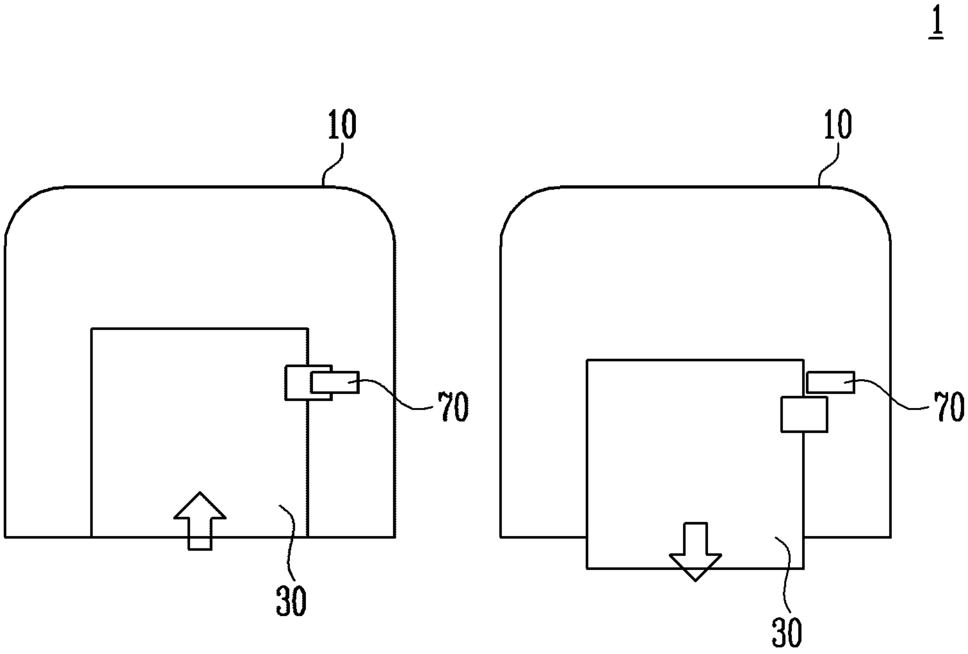
FIGS. 8A and 8B are schematic diagrams of the portable printer according to the first embodiment of the present disclosure.
Figure 9A:
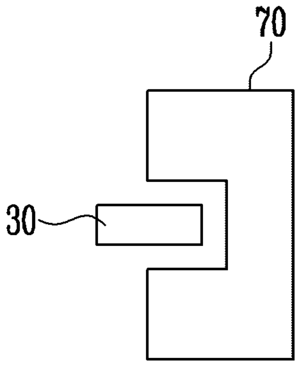
FIGS. 9A and 9B are schematic diagrams of a mode detector of the portable printer according to the first embodiment of the present disclosure.
Figure 9B:
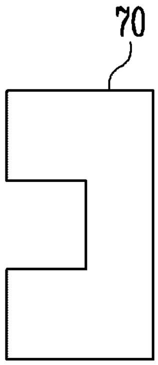
Figure 10:
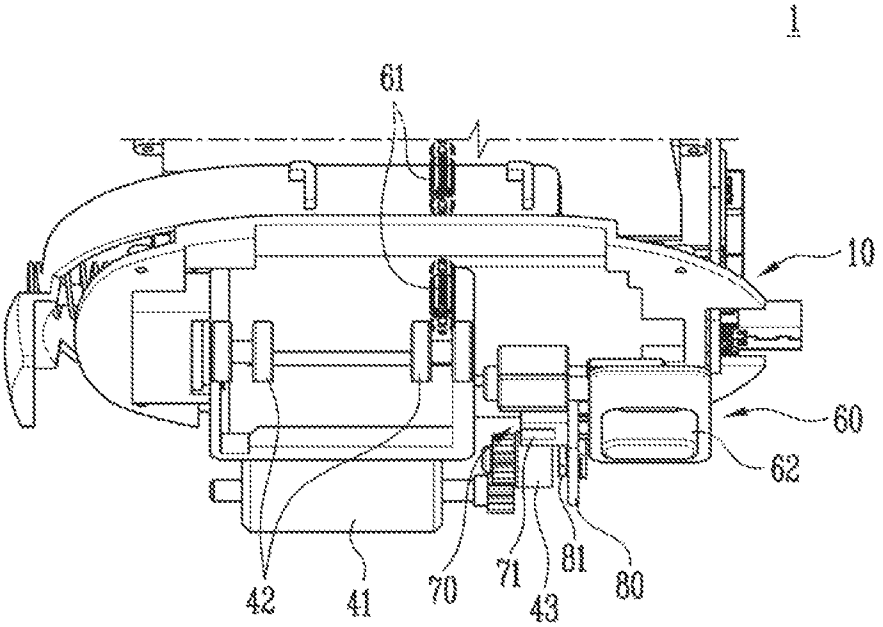
FIG. 10 is a perspective view of the portable printer according to the first embodiment of the present disclosure.

FIGS. 8A and 8B are schematic diagrams of the portable printer according to the first embodiment of the present disclosure, FIGS. 9A and 9B are schematic diagrams of a mode detector of the portable printer according to the first embodiment of the present disclosure, and FIG. 10 is a perspective view of the portable printer according to the first embodiment of the present disclosure.

Figure 11:
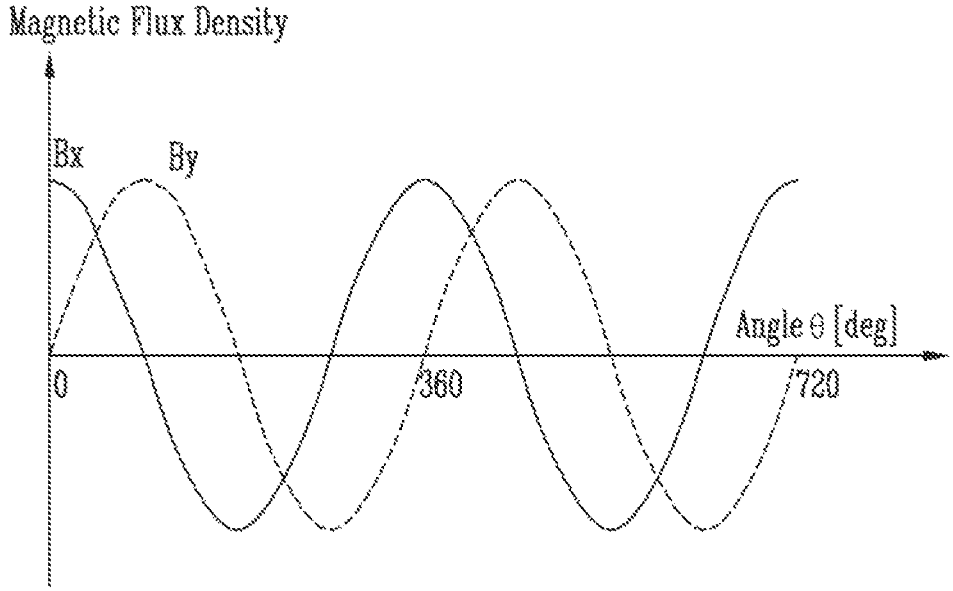
FIG. 11 is a schematic diagram of a sensing unit of the portable printer according to the first embodiment of the present disclosure.
Figure 12:
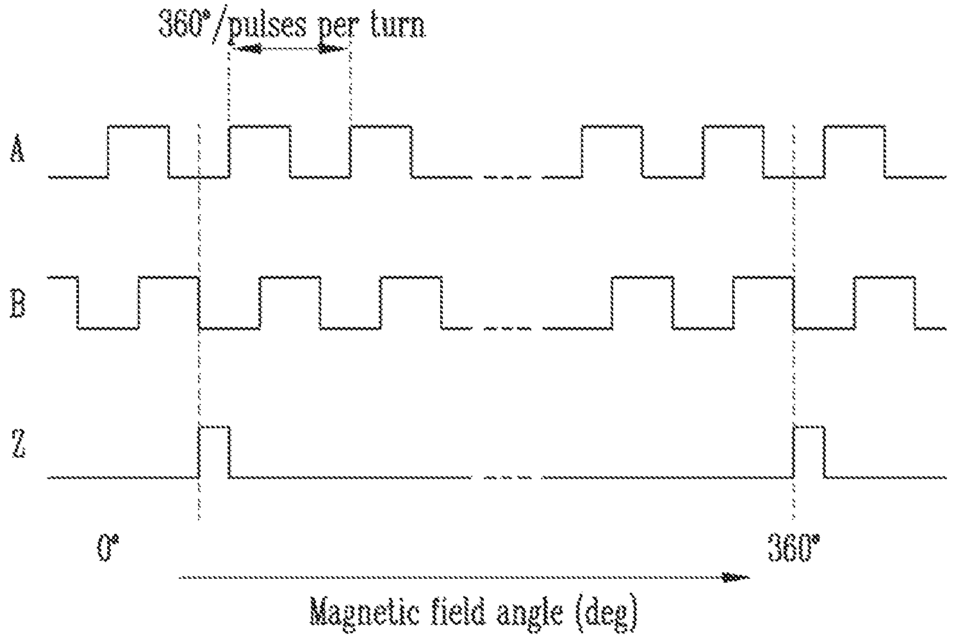
FIG. 12 is a schematic diagram of the sensing unit of the portable printer according to the first embodiment of the present disclosure.
Figure 13:
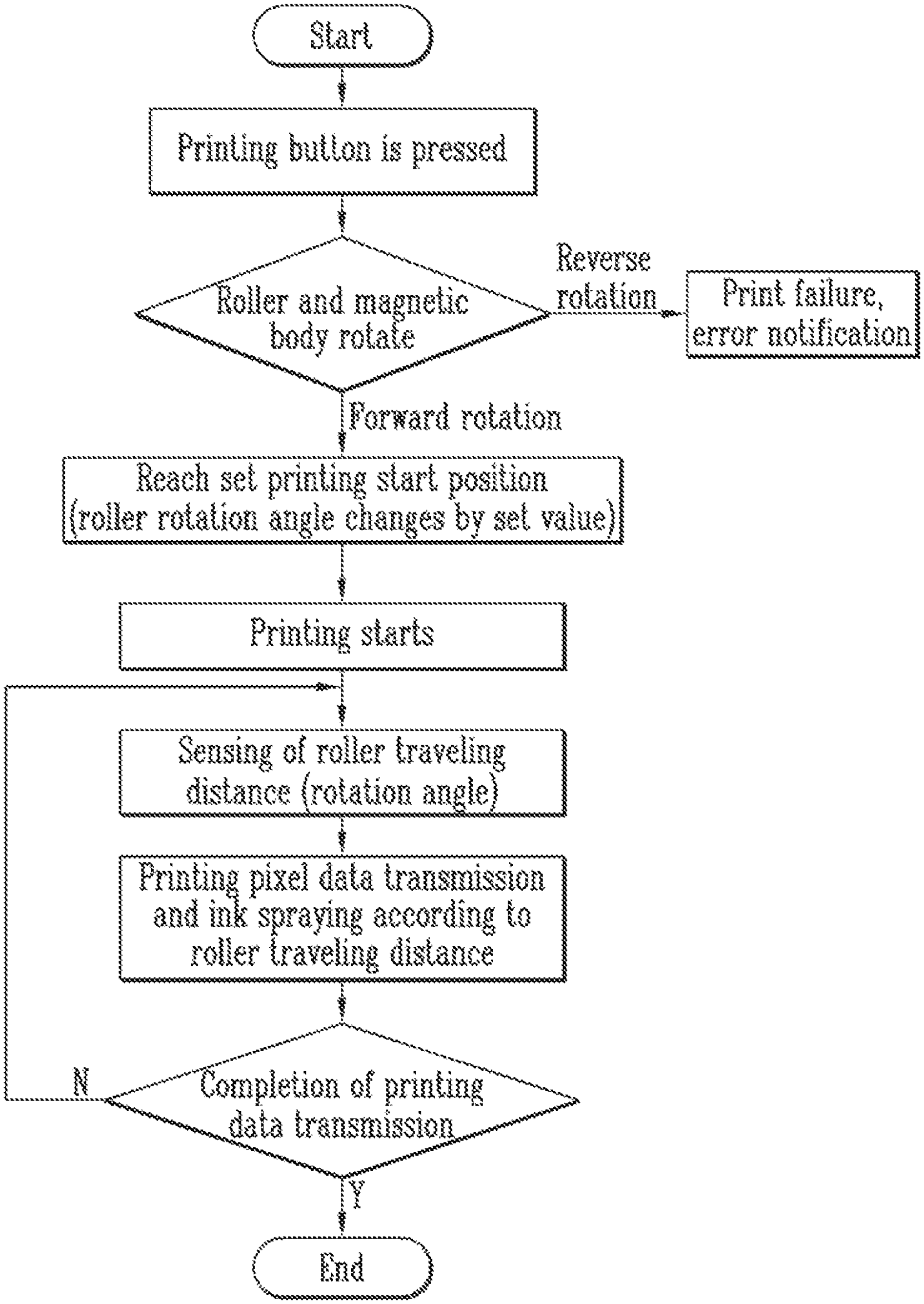
FIG. 13 is an operating flowchart of the portable printer according to the first embodiment of the present disclosure.
Figure 14:
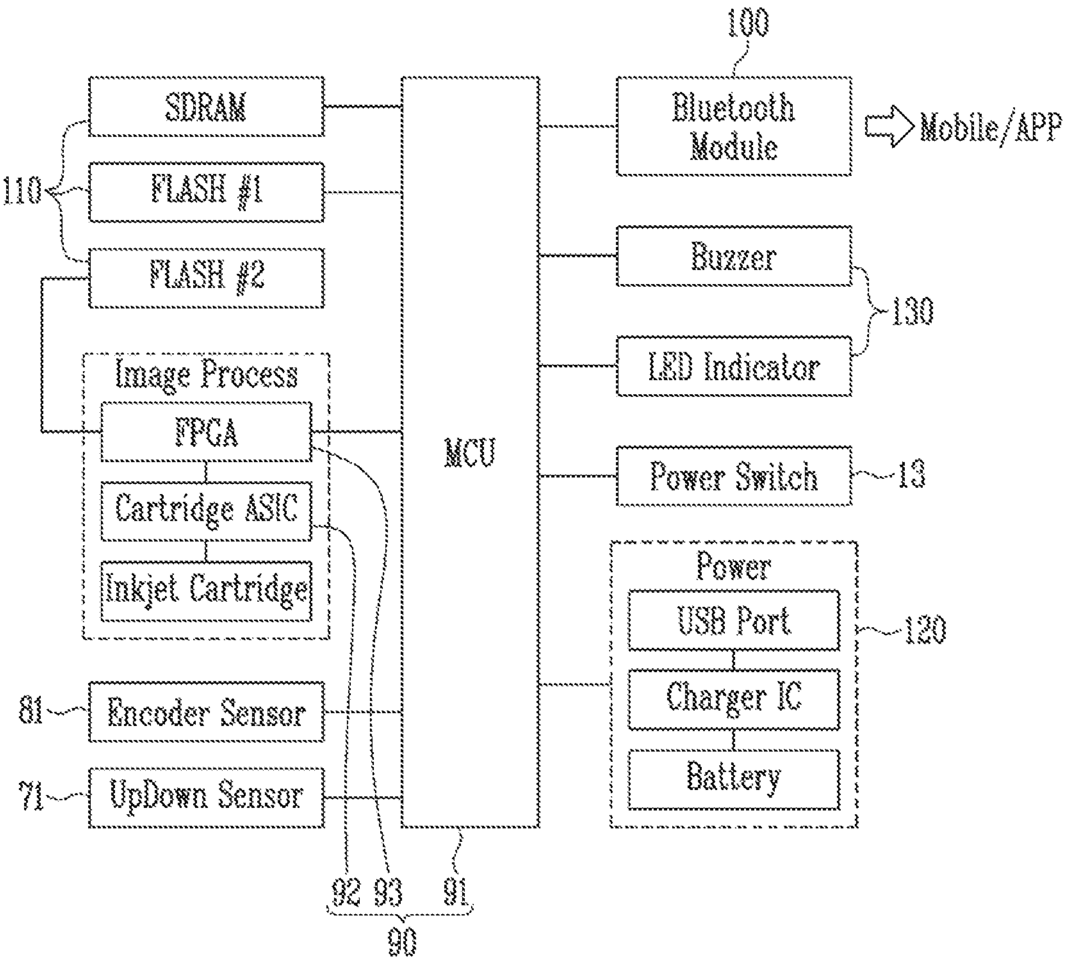
FIG. 14 is a circuit diagram of the portable printer according to the first embodiment of the present disclosure.

In addition, FIGS. 11 and 12 are schematic diagrams of a sensing unit of the portable printer according to the first embodiment of the present disclosure, FIG. 13 is an operating flowchart of the portable printer according to the first embodiment of the present disclosure, and FIG. 14 is a circuit diagram of the portable printer according to the first embodiment of the present disclosure.

Here, FIG. 1 shows a state in which a printer cover is provided, and FIGS. 2 to 4 show a state in which the printer cover is removed. In addition, FIG. 2A, FIG. 4A, FIG. 8A, and FIG. 9A show a mode for printing on a hard target (paper, etc.), and FIG. 2B, FIG. 4B, FIG. 8B, and FIG. 9B show a mode for printing on a soft target (skin, etc.).

First, referring to FIGS. 1 to 3, a portable printer 1 according to the first embodiment of the present disclosure includes a main body 10, a cartridge 20, a seating part 30, a roller 40, and a printer cover 50.

The main body 10 may form the appearance of the portable printer 1. The main body 10 may have a portable form, which means that its size, weight, etc. are generally recognized for its portability.

The main body 10 may have various shapes so that a user can grasp it. For example, the main body 10 may have a box shape, and a edge portion may be curved for improved portability.

The main body 10 may include an upper body 11 and a lower body 12. The upper body 11 and the lower body 12 may be detachable by a separation button 13A provided on one side.

The upper body 11 provides an internal space in which various components for operation of the portable printer 1 can be accommodated. In other words, the upper body 11 may have a structure in which a lower portion may be opened so that various components for operation of the portable printer 1 can be put in and out.

On the other hand, in the present embodiment, the structure in which the lower portion of the upper body 11 is opened is described as an example, but is not limited thereto. For example, the upper body 11 may have a structure in which an upper portion is opened, and various configurations for operation of the portable printer 1 may be put in and out. In this case, the lower body 12 may be detachably coupled to the upper portion of the upper body 11.

The lower body 12 may be coupled to the open lower portion of the upper body 11 to prevent various components for operation of the portable printer 1 from being exposed to the outside. Of course, the lower body 12 may have an open lower portion so that the seating part 30, the roller 40, and a nozzle 22, which are components for printing of the portable printer 1, may be exposed to the outside. In this case, the nozzle 22 may be a part that delivers the printing material to the target having a soft or hard surface.

The exterior of the main body 10 may be provided with at least one operation button for operation of the portable printer 1. The operation button may include a printing button 13B and a power button (not shown). For reference, in the present disclosure, the printing button 13B, the power button, and the separation button 13A may be collectively referred to as a button unit 13.

The printing button 13B may be provided on the upper portion of the upper body 11. The printing button 13B may cause the nozzle 22 to discharge the printing material by a manipulation of the user. On the other hand, FIG. 1 shows that the printing button 13B is provided on the upper portion of the upper body 11 as an example, but the present disclosure is not limited thereto. For example, the printing button 13B may be provided on one side of the exterior of the upper body 11 and may be variously disposed at a position convenient for the user.

The power button may turn on/off power of the portable printer 1. The power button may be provided in the lower portion of the lower body 12, or the power button may be provided on one side of the lower body 12. In other words, the position of the power button is not limited, and may be disposed in a position that is easy to access by the user from the outside of the main body 10.

At least one lamp (not shown) may be provided on a part of the exterior of the lower body 12. The lamp may display an operating state of the portable printer 1. The lamp may provided in the lower portion of the lower body 12, but the present disclosure is not limited thereto. For example, the lamp may be provided on one side of the lower body 12 and may be variously disposed at a position where the user can easily recognize the operating state of the portable printer 1.

For reference, components displaying a state of the portable printer 1 or printing state, including the lamp described above, may be collectively referred to as a display unit 130. In addition, the display unit 130 may be integrated with the button unit 13, so that the button unit 13 itself may have a display function.

On the other hand, in the internal space of the upper body 11, various components for operation of the portable printer 1 may be provided. For example, in the internal space of the upper body 11, the cartridge 20 having the nozzle 22, a carriage (not shown) accommodating the cartridge 20, a controller 90, a communication unit 100, a storage 110, a power unit 120, and the like may be provided.

The power unit 120 may include a battery such as a secondary battery capable of charging and discharging, and at least one power unit may be provided. The power unit 120 may provide power necessary for operation of the portable printer 1. Alternatively, the power unit 120 may not include a battery and may be configured to continuously receive external power.

Among the components accommodated in the main body 10, the controller 90, the communication unit 100, and the like, other than the power unit 120 will be described in detail below.

The cartridge 20 may accommodate the printing material required for printing, and may be provided with the nozzle 22 configured to discharge the printing material in its lower portion. The nozzle 22 may have a shape of a slit extending in a direction perpendicular to a movement direction of the main body 10, and a periphery of the nozzle 22 may be defined as a head 21.

The cartridge 20 is accommodated in the main body 10, and a portion in the main body 10 in which the cartridge 20 is accommodated may be defined as the carriage (not shown). In other words, the carriage has a configuration in which the cartridge 20 is detachably seated, and the carriage may have a shape in which at least a portion thereof is opened such that the head 21 and the nozzle 22 of the cartridge 20 are downwardly exposed through the open lower portion of the lower body 12. Thus, the cartridge 20 may be accommodated in the carriage provided in the main body 10.

The carriage may have a shape corresponding to the shape of the cartridge 20, and one or more cartridges 20 may be seated in one carriage 20. Of course, the carriage may have a partially partitioned structure so that the plurality of cartridges 20 may be seated individually.

At least one cartridge 20 may be provided. For example, one cartridge 20 may be provided by accommodating a printing material of single color. If the cartridge 20 accommodates the printing material of single color, the portable printer 1 may print an image consisting of the single color on the target.

In addition, the cartridge 20 may have a plurality of accommodating parts (not shown) that accommodate printing materials of different colors, and may discharge the printing materials through the nozzle 22. Therefore, when the cartridge 20 has the plurality of accommodating parts that accommodate the printing materials of different colors, the portable printer 1 may print a color image on the target.

Further, a plurality of the cartridges 20 may be provided, and each cartridge 20 may accommodate the printing materials of different colors. In addition, when the plurality of cartridges 20 are provided, the plurality of cartridges 20 may be configured as one module.

A distance sensor (not shown) may be provided on one side of the cartridge 20 for measuring a distance between the skin and the nozzle 22. The distance sensor may measure the distance between the skin and the nozzle 22 and transmit the measured distance value to the controller 90.

In addition, the controller 90 may adjust the distance between the skin and the nozzle 22 by using the distance between the skin and the nozzle 22 transmitted from the distance sensor provided on one side of the cartridge 20. In other words, when the distance between the skin and the nozzle 22 measured by the distance sensor deviates from an appropriate value, the controller 90 may adjust the distance between the skin and the nozzle 22 by moving up and down the seating part 30. The moving up and down of the seating part 30 will be described in detail when describing a printing adjustment unit 60 below.

The printing material stored in the cartridge 20 may be a printing solution having a viscosity of 4 mPa*s to 6 mPa*s, but is not limited thereto. The printing material may include at least one of at least a liquid and a solid (powder, etc.), and may include a gaseous component. It should be noted that even if it is described below as a printing solution, it does not necessarily mean that it is made of 100% liquid components.

The printing solution according to the present disclosure may have a viscosity of 4 mPa*s to 6 mPa*s. If the viscosity of the printing solution is less than 4 mPa*s, the printing solution may leak from the nozzle 22 or flow on the skin after being discharged onto the skin. In addition, if the viscosity of the printing solution exceeds 6 mPa*s, it may take a long time to dry after the printing solution is discharged onto the skin. In particular, when the viscosity of the printing solution exceeds 10 mPa*s, the printing solution may not be discharged from the nozzle 22, or the printing solution may be adsorbed on the nozzle 22 and the nozzle 22 may be closed.

The printing solution may include a pigment or dye and a solvent to disperse the pigment or dye. The solvent may include purified water and an organic solvent, and the organic solvent may determine the viscosity of the printing solution.

Here, the organic solvent may be a nonvolatile organic solvent and may be a substance that is not easily separated when mixed with water because its molecular structure includes a hydrophilic group. For example, the organic solvent may include at least one of PEG-8, glycerin, dipropylene glycol, butylene glycol, propylene glycol, and propanediol.

When the content of the organic solvent in the printing solution is 10 wt % or less, the viscosity of the printing solution may be less than 4 mPa*s, and thus the printing solution may leak from the nozzle 22 or flow on the skin after being discharged to the skin. In addition, when the content of the organic solvent in the printing solution is 40 wt % or more, the viscosity of the printing solution may exceed 6 mPa*s, and thus the printing solution is not discharged from the nozzle 22, or it may take a long time to dry the printing solution. In addition, when the content of a single organic solvent in the printing solution exceeds 20 wt %, the printing solution may not settle on the skin, and may flow on the skin or increase stickiness.

Table 1 below is a table showing the composition of the printing solution of each of Examples 1 to 4 and Comparative Examples 1 to 10, and Table 2 is a table explaining characteristic evaluation results of Examples 1 to 4 and Comparative Examples 1 to 10.

TABLE 1

Composition of printing solution of each of Examples 1 to 4 and Comparative Examples 1 to 10

| Category Name of ingredient | Purified water | Organic solvent PEG-8 | Organic solvent Glycerin | Surfactant Polysorbate 20 | Dye CI 17200 |
|---|---|---|---|---|---|
| Example 1 | to 100 | 20 | — | 0.2 | 4 |
| Example 2 | to 100 | — | 20 | 0.2 | 4 |
| Example 3 | to 100 | 10 | 10 | 0.2 | 4 |
| Example 4 | to 100 | 15 | 10 | 0.2 | 4 |
| Comparative Example 1 | to 100 | 5 | — | 0.2 | 4 |
| Comparative Example 2 | to 100 | 10 | — | 0.2 | 4 |
| Comparative Example 3 | to 100 | 30 | — | 0.2 | 4 |
| Comparative Example 4 | to 100 | 40 | — | 0.2 | 4 |
| Comparative Example 5 | to 100 | — | 5 | 0.2 | 4 |
| Comparative Example 6 | to 100 | — | 10 | 0.2 | 4 |
| Comparative Example 7 | to 100 | — | 30 | 0.2 | 4 |
| Comparative Example 8 | to 100 | — | 40 | 0.2 | 4 |
| Comparative Example 9 | to 100 | 5 | 5 | 0.2 | 4 |
| Comparative example 10 | to 100 | 20 | 20 | 0.2 | 4 |

In Table 1, Examples 1 to 4 and Comparative Examples 1 to 10 are printing solutions prepared by weighing according to the components and contents listed in Table 1, stirring at 300 rpm for 20 minutes, defoaming, and filtering with a filter having a pore size of 0.45 μm.

TABLE 2

Characteristic evaluation results of Examples 1 to 4 and Comparative Examples 1 to 10

| | Viscosity (mPa*s) | Leakage | Discharge | Smear when printing | Smear after drying |
|---|---|---|---|---|---|
| Example 1 | 4.5 | X | ○ | X | X |
| Example 2 | 4 | X | ○ | X | X |
| Example 3 | 4 | X | ○ | X | X |
| Example 4 | 4.5 | X | ○ | X | X |
| Comparative Example 1 | 3 | ○ | ○ | ○ | X |
| Comparative Example 2 | 3.5 | ○ | ○ | ○ | X |
| Comparative Example 3 | 5 | X | Δ | X | ○ |
| Comparative Example 4 | 6.5 | X | X | X | ○ |
| Comparative Example 5 | 3 | ○ | ○ | ○ | X |
| Comparative Example 6 | 3.5 | ○ | ○ | ○ | X |
| Comparative Example 7 | 4.5 | X | Δ | X | ○ |
| Comparative Example 8 | 5.5 | X | X | X | ○ |
| Comparative Example 9 | 3.5 | ○ | ○ | ○ | X |
| Comparative example 10 | 6.5 | X | X | X | ○ |

In Table 2, the viscosity evaluation of the printing solution is measured with a Brookfield DV-E viscometer at Spindle Number 1, 60 rpm, and room temperature conditions, and is expressed in mPa*s. The evaluation of leakage of the printing solution is carried out by filling the HP62 cartridge 20 with 5 ml of the printing solution and leaving the nozzle 22 facing down at room temperature for 3 days, and in Table 2, '0' is marked when leakage occurs, and 'X' is marked when no leakage occurs. The smear evaluation during printing of the printing solution checks the clarity of the image immediately after printing the image on a forearm part using the portable printer 1 filled with the printing solution. When smear occurs in the printed image, '0' is marked, and when no smear occurs, 'X' is marked. The smear evaluation after drying of the printing solution checks a drying state and smearing of the printing solution by printing an image, drying it for 1 minute, and rubbing it three times. When smear occurs in the image dried for one (1) minute, '0' is marked, and when no smear occurs, 'X' is marked.

Referring to Table 1 and Table 2 described above, it can be seen that leakage occurs in Comparative Example 1, Comparative Example 2, Comparative Example 5, Comparative Example 6, and Comparative Example 9 in which the content of organic solvent is 10 wt % or less in the entire printing solution.

In addition, it can be seen that discharge of the printing solution from the cartridge 31 is not smooth in Comparative Example 4, Comparative Example 8, and Comparative Example 10 in which the content of organic solvent is 40 wt % or more in the entire printing solution.

It can be seen that image smearing occurs due to flow on the skin after the printing solution is discharged onto the skin in Comparative Example 1, Comparative Example 2, Comparative Example 5, Comparative Example 6, and Comparative Example 9 in which the content of organic solvent is 10 wt % or less in the entire printing solution.

In Comparative Example 3, Comparative Example 4, Comparative Example 7, and Comparative Example 8 in which the content of a single organic solvent exceeds 20 wt % in the entire printing solution, it can be seen that smearing occurs when rubbed due to insufficient drying. A plurality of the nozzles 22 provided in the head 21 of the cartridge 20 may have different sizes. For example, the nozzles 22 includes a first nozzle 22A and a second nozzle 22B, and the first nozzle 22A may have a larger hole through which the printing material is discharged than the second nozzle 22B.

These nozzles 22 may be arranged side by side along one direction in the head 21, and the first and second nozzles 22A and 22B having different sizes may be alternately arranged. In addition, the first nozzle 22A and the second nozzle 22B may be arranged in a zigzag manner while being alternately arranged. In other words, the first nozzle 22A and the second nozzle 22B may not be side by side and may be provided at least partially misaligned.

The first nozzle 22A may be the nozzle 22 that is basically used regardless of the type of the target, and the second nozzle 22B may be the nozzle 22 auxiliaryly used to increase image resolution when the target is hard such as paper.

The first nozzle 22A and the second nozzle 22B may control discharge of the printing material according to the distance between the nozzle 22 and the target, which will be described in detail below.

The seating part 30 is provided to be exposed to the outside from a lower portion of the main body 10 and faces a surface of the target. The seating part 30 may be exposed or protruding downward from the lower portion of the lower body 12 and may be provided to at least partially surround the nozzle 22.

In other words, the seating part 30 may be provided in the lower portion of the lower body 12, in other words, on a surface facing the skin in the lower body 12 during image printing of the portable printer 1. The seating part 30 may expose the nozzle 22 provided in the lower portion of the cartridge 20.

The seating part 30 is provided with the roller 40 which will be described later, and is provided to be able to move up and down with respect to the main body 10. As a result of this, as heights of the seating part 30 and the roller 40 change with respect to the nozzle 22 of the cartridge 20, a vertical height between the nozzle 22 and the surface of the target may be adjusted.

Therefore, according to the present disclosure, when the portable printer 1 is used on soft skin, even if the user presses it, the distance between the skin and the nozzle 22 may be maintained enough to print a clear image. Adjustment of the height between the nozzle 22 and the target will be described in detail when describing the printing adjustment unit 60 below.

In the lower portion of the seating part 30 or the lower body 12, an optical sensor (not shown) may be provided. In a direction of printing of the portable printer 1, the optical sensor may be provided to correspond to the center of the nozzle 22 at the rear of the head 21. When the portable printer 1 prints the image on the skin, the optical sensor may check a center line of a moving line of the nozzle 22.

The rollers 40 are provided in the lower portion of the main body 10 at the front and rear of the nozzle 22, respectively. Here, the front and rear are based on a direction in which the main body 10 moves along the surface of the target to deliver the printing material to the target. In other words, the rollers 40 are provided at the front of and rear of the nozzle 22 based on the direction in which the main body 10 slides on the surface of the target.

In order to smoothly guide the movement of the main body 10 without causing inconvenience to the target while closely contacting the surface of the target, the roller 40 may have a soft portion in contact with the target. In other words, the roller 40 may be made of a soft material, or may be provided in the form of a soft material coated on a plastic hard material.

The rollers 40 include a first roller 41 and a second roller 42. The first roller 41 may be rotatively coupled to the lower portion of the lower body 12. The first roller 41 is provided at the front of the nozzle 22 with respect to the movement direction of the main body 10 and may separate the nozzle 22 from the skin on which the image is printed.

For example, the first roller 41 includes at least one first rotation shaft (symbol not shown) extending parallel to the nozzle 22, and at least one first wheel (symbol not shown) provided on the first rotation shaft. Here, the first wheel may be provided to overlap with the nozzle 22 along the direction of movement of the main body 10.

When printing an image using the portable printer 1, the user may apply pressure to bring the portable printer 1 into close contact with the skin. In this case, a vertical distance spaced between the skin and the nozzle 22 of the cartridge 20 may be decreased according to the pressure applied by the user.

In the present disclosure, when using the printing solution described in Table 1 above, it is preferable that the distance spaced between the skin and the nozzle 22 of the cartridge 20 is maintained at 0.5 mm to 2.5 mm for clear printing of the image. More preferably, the distance spaced between the skin and the nozzle 22 of the cartridge 20 may be 1.0 mm to 2.0 mm.

When the vertical distance between the skin and the nozzle 22 is less than 0.5 mm or more than 2.5 mm, damage may occur to the image printed using the portable printer 1. In other words, a difference may occur between the image desired by the user and the image printed on the skin.

In particular, when the vertical distance spaced between the skin and the nozzle 22 is less than 0.5 mm, there is a possibility that the nozzle 22 may come into contact with the skin. When the nozzle 22 is in contact with the skin, the rear end of the nozzle 22 and the head 21 may be in contact with the skin. Here, the printing solution discharged from the nozzle 22 may be damaged by the rear end of the nozzle 22 and the head 21.

When the vertical distance spaced between the skin and the nozzle 22 is greater than 2.5 mm, a low-resolution image may be formed on the skin because the distance between the skin and the nozzle 22 is long and the printing solution discharged from the nozzle 22 is dispersed over a wide range.

In the present disclosure, in order to maintain a distance of 0.5 mm to 2.5 mm between the skin and the nozzle 22 of the cartridge 20, a height difference H between a lower end of the first roller 41 and the nozzle 22 on a cross-section of the portable printer 1 may range from 4.5 mm to 8.5 mm.

Preferably, the height difference H between the lower end of the first roller 41 and the nozzle 22 may range from 5.5 mm to 7.5 mm. If the height difference H between the lower end of the first roller 41 and the nozzle 22 is maintained at 4.5 mm to 8.5 mm, a clear image may be printed on the skin.

When the height difference H between the lower end of the first roller 41 and the nozzle 22 is less than 4.5 mm or more than 8.5 mm, damage may occur to the image printed using the portable printer 1. In other words, a difference may occur between the image desired by the user and the image printed on the skin.

In particular, when the height difference H between the lower end of the first roller 41 and the nozzle 22 is less than 4.5 mm, the distance between the skin and the nozzle 22 is close, and thus damage to the image printed on the skin may occur due to aggregation of the printing material discharged from the nozzle 22. This is because when the height difference H between the lower end of the first roller 41 and the nozzle 22 is less than 4.5 mm, the nozzle 22 or the head 21 is in contact with the skin and the image printed on the skin is damaged when the portable printer 1 is moved.

In addition, when the height difference H between the lower end of the first roller 41 and the nozzle 22 is greater than 8.5 mm, the distance between the skin and the nozzle 22 is large and the printing solution discharged from the nozzle 22 is dispersed in a wide range so that a low resolution image may be formed on the skin. In other words, an unclear image may be formed on the skin.

The first roller 41 may guide a printing direction of the portable printer 1. In other words, the first roller 41 may guide the movement of the main body 10. The first roller 41 may have a shape extended parallel to the nozzle 22. For example, the first roller 41 has a roll shape of a predetermined length and may be provided at the front of the head 21 (the nozzle 22) in the movement direction of the main body 10. Here, the length of the first roller 41 may be the same as the extended length of the nozzle 22 or larger than the extended length of the nozzle 22.

In addition, a separation distance W1 between the first roller 41 and the nozzle 22 on a plane of the portable printer 1 may be a distance enough that the first roller 41 is not contaminated by the printing solution sprayed from the nozzle 22. For example, the separation distance W1 between the first roller 41 and the nozzle 22 may be 6.9 mm to 13.1 mm. Preferably, the separation distance W1 between the first roller 41 and the nozzle 22 may be 8.5 mm to 11.5 mm.

When the separation distance W1 between the first roller 41 and the nozzle 22 is less than 6.9 mm, the first roller 41 may be contaminated by the printing solution sprayed from the nozzle 22. In addition, when the separation distance W1 between the first roller 41 and the nozzle 22 exceeds 13.1 mm, even if the skin is pressed by the first roller 41, the skin in an area corresponding to the nozzle 22 may be recovered by skin elasticity, and the distance between the nozzle 22 and the skin may be less than 0.5 mm. Therefore, when the separation distance W1 between the first roller 41 and the nozzle 22 is greater than 13.1 mm, the nozzle 22 or the head 21 may be in contact with the skin, and the printed images may be damaged when the portable printer 1 is moved.

The second roller 42 may be rotatably coupled to the lower portion of the lower body 12. The second roller 42 may be provided at the rear of the head 21 (the nozzle 22) based on the movement direction of the main body 10. The second roller 42 may separate the skin on which the image is printed and a lower surface of the lower body 12, and may roll along the skin together with the first roller 41.

The second roller 42 may be provided in the shape of a wheel to decrease a contact area with the skin. For example, a plurality of the second rollers 42 may include a plurality of second rotation shafts (symbol not shown) provided parallel to the nozzle 22 and a plurality of second wheels (symbol not shown) provided on each of the plurality of second rotation shafts. Here, the plurality of second wheels are provided to be misaligned from the nozzle 22 along the movement direction of the main body 10. In other words, the second roller 42 may be spaced apart from a moving line of the nozzle 22.

Two second rollers 42 may be provided, for example. The two second rollers 42 may be spaced apart from each other. For example, the two second rollers 42 may be spaced apart from each other by at least the extended length of the nozzle 22.

Therefore, while the second rollers 42 move along a printing path of the portable printer 1, they may not come into contact with the discharged printing solution. By not contacting the discharged printing solution and the second roller 42, an image similar to the original image may be printed on the skin without smearing.

In addition, since the second roller 42 does not contact the discharged printing solution, it is possible to prevent the printing solution from being transferred to the skin by the second roller 42 after being migrated to the second roller 42.

On a plane of the portable printer 1, a distance W2 between the second roller 42 and the nozzle 22 may be substantially the same as the distance W1 between the first roller 41 and the nozzle 22. For example, the separation distance W2 between the second roller 42 and the nozzle 22 on the plane of the portable printer 1 may be 6.9 mm to 13.1 mm. Preferably, the separation distance W2 between the second roller 42 and the nozzle 22 may be 8.5 mm to 11.5 mm.

When the separation distance W2 between the second roller 42 and the nozzle 22 is less than 6.9 mm, the second roller 42 may be contaminated by the printing material sprayed from the nozzle 22. In addition, when the separation distance W2 between the second roller 42 and the nozzle 22 exceeds 13.1 mm, even if the skin is pressed by the second roller 42, the skin in the area corresponding to the nozzle 22 may be recovered by skin elasticity, and the distance between the nozzle 22 and the skin may be less than 0.5 mm. Therefore, when the separation distance W2 between the second roller 42 and the nozzle 22 exceeds 13.1 mm, the nozzle 22 or the head 21 may be in contact with the skin, and the printed image may be damaged when the portable printer 1 is moved.

In the present embodiment, as an example, the second roller 42 is provided at the rear of the head 21 in the moving direction of the main body 10, and the two second rollers 42 disposed spaced apart from the moving line of the nozzle 22 are provided, but the present disclosure is not limited thereto.

In addition, the first roller 41 and the second roller 42 may have a structure capable of moving up and down. If the first roller 41 and the second roller 42 are capable of moving up and down, even if the portable printer 1 is pressed by the user during use, the distance between the skin and the nozzle 22 may be maintained enough to ensure clear image printing.

The printer cover 50 is detached to at least one of the main body 10 and the seating part 30 and seals the nozzle 22. The printer cover 50 may be detachably coupled to the lower portion of the lower body 12 to cover the lower portion of the lower body 12. In other words, the printer cover 50 may cover the head 21, the first roller 41, the second roller 42, and the like exposed or protruding from the lower portion of the lower body 12.

Therefore, the printer cover 50 may prevent contamination of the head 21, the first roller 41, the second roller 42, and the like, suppress the printing solution from being applied to unnecessary places, and protect the head 21 and the nozzle 22 from external impact.

Hereinafter, a method of using the above-described portable printer 1 on the skin will be described.

First, the user may apply a primer for skin flattening on the skin before printing an image on the skin using the portable printer 1. The above-described primer may flatten the skin to make the image printed on the skin more clear by the portable printer 1. Here, the primer may be a liquid primer or a solid primer.

The liquid primer may include a large amount of volatile solvent, such as ethanol and a film component, for quick drying. However, since ethanol is a volatile solvent in the liquid primer, it may irritate the skin. In addition, the film component is highly irritating to the skin and may cause difficulty in cleansing.

On the other hand, the solid primer may have a significantly lower content of volatile solvent than the liquid primer, resulting in low skin irritation. In addition, the solid primer has a low content of volatile solvent, so the skin may be flattened in a short time. Since the solid primer does not contain the film component, it can be easy to cleanse. Therefore, it may be preferable to use the solid primer as the primer.

After applying the primer to the skin, the user removes the printer cover 50 of the portable printer 1. The user may then switch the portable printer 1 to an On state using the power button.

When the portable printer 1 is turned on, the battery may provide power to each part of the portable printer 1 that requires the power so that the portable printer 1 can perform printing operation.

This will be described in detail as follows. When the portable printer 1 is turned on, the user may select an image to be printed on the skin using an external device wired or wirelessly connected to the communication unit 100, for example, a smartphone, a tablet, a computer, or a server.

Here, the image may be any one of images previously stored in the portable printer 1. In addition, the image may be stored in the external device or may be an image obtainable from a site connected to the external device. The image stored in the external device or of the site connected to the external device may be transmitted to the controller 90 of the portable printer 1 through the communication unit 100.

When the image to be printed on the skin is selected by the user, the user may place the portable printer 1 on the skin. Once the portable printer 1 is seated on the skin, the user can start printing the selected image by operating the printing button 13B.

When printing of the selected image starts, the user may move the portable printer 1 at a constant speed to cause the portable printer 1 to print the selected image. Here, the portable printer 1 may move while being guided by the first roller 41. In addition, while the portable printer 1 is moving, the nozzle 22 for discharging the printing solution onto the skin may be spaced apart from the skin at a predetermined interval by the first roller 41.

In other words, while the portable printer 1 moves on the skin surface while being carried by the user, the distance between the skin and the nozzle 22 may be maintained at 0.5 mm to 2.5 mm by the first roller 41 so that the image can be clearly printed on the skin.

After the image is printed by the portable printer 1, an adhesive coating to protect the image may be performed. The adhesive coating may be performed using a spray method.

As described above, the portable printer 1 of the present disclosure may print a clear image on the skin because the distance between the skin and the nozzle 22 is maintained at 0.5 mm to 2.5 mm while printing the image.

In addition, if the skin is flattened using the primer before printing the image, a clearer image may be printed on the skin.

The printing adjustment unit 60 moves at least the roller 40 among the seating part 30 and the roller 40 in inner and outer directions of the main body 10. However, since the rotation shaft of the roller 40 may be provided in the seating part 30, the roller 40 may be moved integrally with the seating part 30 by the printing adjustment unit 60.

The printing adjustment unit 60 may move the seating part 30 so that the seating part 30 and the roller 40 are moved in the inner and outer directions of the main body 10. At this time, the movement by the printing adjustment unit 60 may be in any one direction of the inner direction and the outer direction of the main body 10, and the other direction may be manually made by the user.

The printing adjustment unit 60 moves the seating part 30 or the like in the inner and outer directions of the main body 10 to adjust the height difference between the nozzle 22 and the roller 40. This allows the present embodiment to adjust the height difference between the nozzle 22 and the surface of the target.

As mentioned at the outset, the present disclosure may be used in combination with soft skin or hard paper. However, between the first roller 41 and the second roller 42, the skin is convexly deformed toward the nozzle 22 by skin elasticity, whereas the paper is not.

Considering the characteristic that when a soft target is pressurized by the first roller 41 and the second roller 42, it is convexly deformed toward the nozzle 22 between the first roller 41 and the second roller 42, it is possible to adjust a vertical height of the nozzle 22 according to the hardness of the target using the printing adjustment unit 60 according to the present disclosure.

For example, the nozzle 22 may be disposed closer to an inside of the main body 10 compared to the roller 40, and when the printing material is delivered to the soft skin, the printing adjustment unit 60 may move the roller 40 to a protruding position to adjust the height between the nozzle 22 and the roller 40 to 6.0 mm to 7.0 mm.

Alternatively, when the printing adjustment unit 60 delivers the printing material to the hard paper, the roller 40 may be moved to a retracted position to adjust the height between the nozzle 22 and the roller 40 to 0.5 mm to 2.5 mm.

As mentioned above, the printing adjustment unit 60 may have a configuration that assists the movement of the roller 40 by external pressure instead of automatically realizing the movement of the roller 40.

When the nozzle 22 intends to print an image on a soft target such as the skin, the printing adjustment unit 60 may cause the vertical height of the head 21 and the lower end of the roller 40 to preferably be maintained at about 6.5 mm. Through this, an appropriate gap is formed between the nozzle 22 and the skin, preventing the printing material from smearing or clumping.

On the other hand, when the nozzle 22 is a hard target including paper (base paper for nail stickers, etc.), the printing adjustment unit 60 may preferably maintain the vertical height of the head 21 and the lower end of the roller 40 at about 2.0 mm. As an appropriate gap is formed between the nozzle 22 and the paper, clarity of the printing material may be guaranteed.

In other words, in this embodiment, the distance between the nozzle 22 and the surface of the target, precisely, the vertical distance between the roller 40 pressurizing the target and the nozzle 22 delivering the printing material to the target, is changed according to the hardness of the target. Through this, the present embodiment may sufficiently guarantee the quality of printing even if the hardness of the target is different.

Changing the vertical height of the head 21 and the lower end of the roller 40 as described above is in consideration of the fact that the target may be convexly deformed toward the head 21 between the first roller 41 and the second roller 42 when the target is soft. Since the present disclosure utilizes the printing adjustment unit 60, the vertical height between the surface of the target and the nozzle 22 may be formed to be the same regardless of whether the target is hard or soft.

For reference, both the nozzle 22 and the head 21 are configured at the lower end of the cartridge 20, and the head 21 refers to the periphery of the nozzle 22, and in this specification, the nozzle 22 and the head 21 are disposed at the same vertical height. Therefore, when the vertical height of the head 21 and the roller 40 is changed, the vertical height of the nozzle 22 and the roller 40 is also changed. As mentioned above, the vertical height to the surface of the target relative to the nozzle 22 and the head 21 is adjusted relatively constant as the roller 40 moves according to the hardness of the target.

Hereinafter, a method in which the user uses the printing adjustment unit 60 of the present disclosure to switch to a state where the seating part 30 protrudes downward from the lower body 12 and a state where the seating part 30 protrudes relatively less downward from the lower body 12 is described in detail.

First, when the user selects the skin as the target for printing the image, the user may use it in a state where the seating part 30 and the roller 40 are placed in the protruding position, as shown in FIG. 2A, FIG. 4A, and the like. In this case, the first roller 41 and the second roller 42 are provided at the front and rear of the head 21, respectively, and the first roller 41 and the second roller 42 maintain the same height difference from the nozzle 22 when the seating part 30 is moved in and out by the printing adjustment unit 60.

In the state of FIG. 2A, the vertical height between the first roller 41 and the nozzle 22 and the vertical height between the second roller 42 and the nozzle 22 may be about 2.0 mm. Therefore, for paper that does not deform convexly between the first roller 41 and the second roller 42, the vertical distance from the nozzle 22 is spaced to an appropriate level.

The user adheres the portable printer 1 shown in FIG. 2A and the like to the paper, and slides the main body 10 on the paper using the first roller 41 or the like. At this time, since the distance between the nozzle 22 and the paper is appropriately spaced to 2.0 mm or less, a clear image may be printed on the paper.

On the other hand, when the user selects the skin as the target for printing the image, the user may use it in a state where the seating part 30 and the roller 40 are placed in the protruding position, as shown in FIG. 2B, FIG. 4B, and the like. In this case, the first roller 41 and the second roller 42 are provided at the front and rear of the head 21, respectively, and the first roller 41 and the second roller 42 maintain the same height difference from the nozzle 22 when the roller 40 is moved in and out by the printing adjustment unit 60.

In the state of FIG. 2B and the like, the vertical height between the first roller 41 and the nozzle 22 and the vertical height between the second roller 42 and the nozzle 22 may be about 6.5 mm. Therefore, even if the skin has a characteristic of being convexly deformed by skin elasticity, the distance between the nozzle 22 and the skin is spaced at an appropriate level between the first roller 41 and the second roller 42.

The user adheres the portable printer 1 as shown in FIG. 2B, etc. to the skin and slides the main body 10 on the skin using the first roller 41. Here, since the distance between the nozzle 22 and the skin is properly spaced at about 2.0 mm, a clear image may be printed on the skin.

In this embodiment, the inward and outward movement of the seating part 30 and the roller 40 implemented by the printing adjustment unit 60 may use a rack, a rack gear, or the like. Alternatively, various other means capable of changing and maintaining the vertical height of the seating part 30 to two or more values may be used. Hereinafter, a specific structure that the printing adjustment unit 60 of the present disclosure may have is exemplarily illustrated.

Specifically, the printing adjustment unit 60 may adjust the height of the seating part 30 (or the roller 40) using an elastic member 61, an operating member 62, and a cam 63.

The elastic member 61 is provided between the main body 10 and the seating part 30, and has an elastic force to maintain the seating part 30 in a restoration position that is either a retracted position or a protruding position with respect to the main body 10.

The seating part 30 may have a wall 31 that is retracted into the inside of the main body 10 and extends to the interior of the upper body 11, and the elastic member 61 may be provided between one point of the wall 31 and a specific point of the main body 10. Therefore, an elastic force is imparted between the main body 10 and the seating part 30 in the height direction.

The elastic member 61 may be a tension spring to maintain the seating part 30 in the retracted position. In other words, the elastic member 61 may be a spring that implements movement in the opposite direction with the elastic force when being tensioned. For example, when the seating part 30 protrudes with respect to the main body 10, the elastic member 61 between the main body 10 and the wall 31 is tensioned, so that the seating part 30 is subjected to the elastic force to return to the retracted position in which it is retracted into the main body 10.

In other words, the elastic member 61 may set the retracted position to the restoration position with respect to the seating part 30. Therefore, the printing adjustment unit 60 may retract the seating part 30 using the elastic member 61.

The operating member 62 is provided in the seating part 30 and places the seating part 30 at a change position of one of the retracted position or the protruding position with respect to the main body 10 by external manipulation. When the elastic member 61 sets the retracted position to the restoration position, the operating member 62 may cause the seating part 30 to be placed in the protruding position.

For example, the operating member 62 is deformed to push out the main body 10 from the seating part 30 while tensioning the elastic member 61 by external manipulation, so that the seating part 30 is placed in the protruding position. In other words, the operating member 62 may cause the main body 10 to move up with respect to the seating part 30, or conversely, the seating part 30 to move down with respect to the main body 10.

The operating member 62 may be in the form of an operation button exposed to the outside. In other words, the operating member 62 may be provided on the seating part 30 and may be disposed to be exposed on the surface of the seating part 30. In addition, the operating member 62 is surrounded by the seating part 30 and is provided so that it does not protrude from the seating part 30 so as not to interfere with printing.

The operating member 62 is provided to be movable in a horizontal direction. In other words, the operating member 62 may be provided so that it does not protrude downward from the seating part 30 regardless of whether it is manipulated or not. The operating member 62 is placed in a first position when the seating part 30 is restored to the retracted position by the elastic member 61, and when it moves to a second position in the horizontal direction, a force for lifting the main body 10 with respect to the seating part 30 may be induced.

The cam 63 is provided between the seating part 30 and the main body 10, and one end of the cam 63 is rotatably provided by the operating member 62. In other words, the cam 63 is provided in a form of rotating with respect to a rotation shaft (symbol not shown), but one end and the other end may be asymmetrically provided.

When one end of the cam 63 is rotated by the operating member 62, a height of the other end facing the main body 10 may be variable. In other words, when the operating member 62 moves from the first position to the second position, the cam 63 may rotate in a predetermined direction and the height of the other end may increase. The other end of the cam 63 may be provided to come into contact with a predetermined point inside the main body 10, and when the height of the other end of the cam 63 increases, the main body 10 moves up with respect to the seating part 30.

At this time, the elastic member 61 is tensioned while a force greater than the elastic force is applied, and the seating part 30 is placed in the protruding position with respect to the main body 10. In particular, a portion of the cam 63 that pushes up the main body 10 has a planar shape as shown in FIG. 6B, and therefore, in the state of FIG. 6B, despite the elastic force of the elastic member 61, the seating part 30 may be maintained in the protruding position.

Hereinafter, a method of using the printing adjustment unit 60 will be described.

First, in this embodiment, when the operating member 62 is in the first position and the seating part 30 is in the retracted position in which it is retracted into the main body 10 by the elastic member 61, the portable printer 1 has the form shown in FIG. 2B and the like. Here, the height of the nozzle 22 compared to the first roller 41 or the second roller 42 is about 2.0 mm.

The user may slide the portable printer 1 in this state against the paper so that the image is printed at an appropriate resolution on the paper or the like. At this time, the seating part 30 may be structurally engaged within the main body 10 so that additional retraction may be restricted, and despite the weight of the seating part 30, protrusion of the seating part 30 is also limited due to the elastic member 61. Therefore, the interval between the roller 40 and the nozzle 22 provided in the seating part 30 may be kept constant.

On the other hand, when the user wants to print on a soft target such as the skin instead of the paper, the user moves the operating member 62 by pushing it in the horizontal direction. At this time, as the cam 63 associated with the operating member 62 rotates, the other end of the cam 63 pushes up the main body 10 to fix it, and the elastic member 61 provided between the main body 10 and the seating part 30 is tensioned.

The user may slide the portable printer 1 in the state shown in FIG. 2B against the skin so that the image is printed at an appropriate resolution on the skin. At this time, since the flat portion of the other end of the cam 63 comes into contact with the inside of the main body 10, the seating part 30 is restricted from moving inside the main body 10. In addition, further protrusion of the seating part 30 may be strictly limited by the elastic force of the tensioned elastic member 61. Therefore, the gap between the roller 40 and the nozzle 22 provided in the seating part 30 is maintained at about 6.5 mm.

When the user wants to switch the portable printer 1 in the state shown in FIG. 2B and the like to the state of FIG. 2A and the like, the user moves the operating member 62 from the second position to the first position. At this time, when the flat portion of the other end of the cam 63 deviates from the portion that comes into contact with the inside of the main body 10, the seating part 30 and the roller 40 automatically move to the inner side of the main body 10 by the elastic force of the elastic member 61.

In other words, when the operating member 62 needs to move from the first position to the second position to move the seating part 30 from the retracted position to the protruding position, an external force equal to or greater than the elastic force of the elastic member 61 is required. On the other hand, when the operating member 62 needs to move horizontally from the second position to the original position in order to move the seating part 30 from the protruding position to the retracted position, the elastic force of the elastic member 61 may be used auxiliaryly and thus less external force may be required compared to the case of protruding the seating part 30.

Therefore, in the present embodiment, since the seating part 30 may mainly maintain the state of being retracted into the main body 10, the seating part 30 or the roller 40 may be protected from external impact or foreign matter.

Hereinafter, with reference to FIGS. 1 to 7 and FIG. 8 and the like described above, components that the portable printer 1 may include are further described.

Referring to FIGS. 1 to 10, the portable printer 1 according to the first embodiment of the present disclosure includes a mode detector 70 and the controller 90.

The mode detector 70 checks whether the portable printer 1 is in a mode (first mode) for printing on the hard target (paper, etc.) or a mode (second mode) for printing on the soft target (skin, etc.). The first mode may be a mode in which the nozzle 22 and the surface of the target form a first height, and the second mode may be a mode in which the nozzle 22 and the surface of the target form a second height greater than the first height.

As described above, the portable printer 1 includes the printing adjustment unit 60, and the printing adjustment unit 60 moves the seating part 30 in the inner and outer directions of the main body 10. When the seating part 30 is moved by the printing adjustment unit 60, the interval between the roller 40 and the nozzle 22 may be adjusted as the roller 40 moves integrally with the seating part 30, thereby adjusting the height between the nozzle 22 and the target.

In connection with the first mode in which the seating part 30 is retracted to the main body 10 by manipulation of the operating member 62 or the second mode in which the seating part 30 is protruding from the main body 10, the mode detector 70 may detect switch of the modes and the current mode.

For example, the mode detector 70 may detect the height difference between the nozzle 22 and the surface of the target by detecting the position of the seating part 30, and may estimate the current mode of the portable printer 1. For this purpose, the mode detector 70 may use an interrupt sensor 71.

The interrupt sensor 71 is a sensor having a light emitter and a light receiver, and the light emitter and the light receiver may be spaced apart from each other at a certain interval. The interrupt sensor 71 may have a "C" shape as shown in FIG. 9.

The interrupt sensor 71 detects the height of the seating part 30 in conjunction with the seating part 30. Specifically, at least a portion of the wall 31 of the seating part 30 may be provided to interact with the interrupt sensor 71.

A protrusion (symbol not shown) may be provided on the wall 31 of the seating part 30, and the protrusion moves along the height direction of the main body 10 according to the inner and outer direction movement of the seating part 30. In this case, the protrusion may be placed between the light emitter and the light receiver of the interrupt sensor 71 according to the moving up and down of the seating part 30, or at a height misaligned from the light emitter and the light receiver.

For example, as shown in FIGS. 8A and 9A, when the seating part 30 is retracted into the main body 10, the protrusion of the seating part 30 is provided at a position that interferes with the interrupt sensor 71. In other words, the interrupt sensor 71 may detect interference of received light and check retraction of the seating part 30. In this case, the mode detector 70 detects whether the portable printer 1 is the first mode for printing on the hard target.

On the other hand, when the seating part 30 is protruding from the main body 10 as shown in FIGS. 8B and 9B, the protrusion of the seating part 30 is placed to be misaligned from the interrupt sensor 71, so that the interrupt sensor 71 receives light. Accordingly, the interrupt sensor 71 may check the received light and detect that the seating part 30 is protruding. In this case, the mode detector 70 detects that the portable printer 1 is in the second mode for printing on the soft target.

Of course, in addition to using the wall 31 of the seating part 30, the mode detector 70 may utilize a structure other than the wall 31 of the seating part 30. In addition, considering that the roller 40 moves up and down integrally with the seating part 30, the mode detector 70 may check the mode through detection of the roller 40. Moreover, the mode detector 70 may detect the position of the operating member 62 of the printing adjustment unit 60 to check the mode.

In addition, the mode detector 70 may use other sensing means in addition to the interrupt sensor 71 using light. Furthermore, the mode detector 70 may use a physical sensing means in addition to an electronic sensing means.

The controller 90 may control operation of the portable printer 1. For example, the controller 90 may turn on/off the power of the portable printer 1 by manipulation of the power button of the user.

In addition, the controller 90 may discharge the printing material received in the cartridge 20 through the nozzle 22 through a signal by manipulation of the printing button 13B of the user to print an image on the skin of the human body.

The controller 90 controls delivery of the printing material by the nozzle 22 so that the image is clearly printed on the target. To this end, the controller 90 may control the nozzle 22 from which the printing material is discharged according to the position of the seating part 30, and in particular, the controller 90 may utilize the mode detection result by the mode detector 70. When the portable printer 1 is detected in the first mode or the second mode by the mode detector 70, the controller 90 may control the discharge of the printing material through the nozzle 22 differently depending on the mode. For example, the controller 90 may appropriately control at least one of the first nozzle 22A and the second nozzle 22B described above with respect to FIG. 7.

When printing on the hard material such as paper, the gap between the nozzle 22 and the paper is narrowed, and the printing material is almost not blown away. Therefore, the controller 90 controls the printing material to be delivered by the first nozzle 22A and the second nozzle 22B when the mode detector 70 detects the first mode. Through this, the present embodiment may increase the resolution of the image by utilizing both the nozzle 22A with a large hole and the small nozzle 22B in the first mode for printing on paper.

On the other hand, when printing on the soft material such as skin, the distance between the nozzle 22 and the skin is widened, and this interval increases a spraying angle of the printing material, causing the printing material to disperse farther. In other words, when the distance between the nozzle 22 and the target is widened, the printing material sprayed from the small nozzle 22B may be blown and smeared. Accordingly, when the mode detector 70 detects the second mode, the controller 90 may control the printing material to be delivered using only the first nozzle 22A of the first nozzle 22A and the second nozzle 22B. Through this, according to the present disclosure, it is possible to increase the print quality by spraying the printing material only in the nozzle 22A with a large hole in the second mode for printing on the skin, etc., so that the printing material is settled at a correct position.

As described in this embodiment, it is possible to maintain the best print quality in any mode by detecting the skin/paper printing mode through the sensing of moving up and down of the sensing unit 70 and adjusting the type (size) of the nozzle 22 from which the printing material is discharged according to each mode.

Of course, unlike FIG. 7, a plurality of the nozzles 22 of the same size may be arranged, and the present embodiment may implement printing in a different manner than described above. As an example, in the present embodiment, the printing material may be delivered through at least some of the plurality of nozzles 22 in the first mode, and the printing material may be delivered in the second mode through a smaller number of nozzles 22 than the number of nozzles 22 used in the first mode.

In addition, in this embodiment, when the plurality of nozzles 22 are arranged in the head 21, the interval between the nozzles 22 from which the printing material is discharged in the second mode may be larger compared to the first mode. In other words, in the present embodiment, the minimum interval of the nozzles 22 discharging the printing material in the first mode is set to a first interval, and the minimum interval of the nozzles 22 discharging the printing material in the second mode may be set to a second interval greater than the first interval.

In addition, the present disclosure may variously modify the size, arrangement and control of the nozzles 22 so as to secure the best resolution when printing an image on paper and skin, respectively.

For reference, the method of changing the nozzle 22 for discharging the printing material according to the mode as described above may be adjusted by the controller 90 of the portable printer 1, or after the method of changing is determined when an image for printing is generated by an application (APP) of a user terminal 210 to be described later, the controller 90 of the portable printer 1 may control the nozzle 22 according to the previously determined method. Here, the image for printing is obtained by converting an image (original) that is displayed to the user and selected by the user into a pixel-expressed form that can be dotted by the portable printer 1.

In addition, printing data described below is processed into a form suitable for communication (a form that can be broken into pieces and transmitted) so that the image for printing in the form expressed as pixels can be used for spraying the printing material. In other words, in this embodiment, the data may be processed in the order of the original image (printing APP)—the image for printing (printing APP)—the printing data (controller 90).

Thus, the portable printer 1 may use the printing data to cause the nozzle 22 to spray the printing material. For reference, the control of the nozzle 22 may be made by the controller 90 included in the portable printer 1 or may be determined in the printing APP. For example, the printing APP may determine what size orifice nozzle 22 to use (control of type of nozzle 22), and the controller 90 may actually control the nozzle 22 so that the printing material can be delivered to the target at the nozzle 22.

Hereinafter, referring to FIGS. 10 to 14, a sensing unit 80 included in the portable printer 1 according to the first embodiment of the present disclosure and related control of the controller 90 are described.

The portable printer 1 of the present embodiment includes the roller 40 as described above, and the first roller 41 and the second roller 42 are provided at the front and rear respectively with respect to the head 21. In this case, at least one of the first roller 41 and the second roller 42 may be provided with a magnetic body 43.

The magnetic body 43 contains a magnetic material that causes a magnetic field and rotates with the rotation of the roller 40, and may be provided on the roller 40 or provided separately from the roller 40 but may rotate in conjunction with the rotation of the roller 40.

In other words, the magnetic body 43 may be embedded in the roller 40, applied to the surface of the roller 40, or provided at least one end of both ends of the roller 40. Alternatively, as shown in FIG. 10, the magnetic body 43 may be provided separately from the roller 40 and may rotate in response to the rotation of the roller 40 by engaging with the roller 40 with a gear (symbol not shown).

The magnetic body 43 may rotate when the roller 40 rotates at the same RPM. Alternatively, the magnetic body 43 may rotate at an RPM proportional to the RPM of the roller 40. In other words, the RPM of the magnetic body 43 is directly related to the rotation of the roller 40.

The magnetic body 43 forms the magnetic field through the magnetic material, and when the magnetic body 43 rotates, a change occurs in the magnetic field. In other words, in this embodiment, when the roller 40 rotates, the change in the magnetic field occurs through the magnetic body 43, which means that the change in the magnetic field is induced when the portable printer 1 moves on the surface of the target.

Therefore, in this embodiment, the sensing unit 80 detecting the magnetic field of the magnetic body 43 may be used to more accurately figure out the movement of the portable printer 1 and thereby control the delivery of the printing material. Hereinafter, the sensing unit 80 will be described in detail.

The sensing unit 80 detects the magnetic field according to the rotation of the magnetic body 43. By detecting the change in the magnetic field, the sensing unit 80 may allow a traveling direction, a traveling speed, and a traveling distance of the roller 40 to be figured out.

For reference, in the present specification, the traveling speed or traveling distance of the roller 40 figured out by the portable printer 1 may mean a degree to which the speed or distance changes during a printing process, not an absolute value for the speed or distance. In other words, the controller 90, which will be described later, does not directly calculate or determine the traveling speed of the roller 40 and the like, but may detect that an electrical signal related to the traveling speed of the roller 40 and the like changes in real time and control generation of a printing signal accordingly. Of course, the present disclosure does not exclude the case in which the controller 90 figures out an absolute value of speed or distance and utilizes it.

The sensing unit 80 may include an encoder sensor 81 that detects the change in the magnetic field (rotation angle) according to the rotation of the magnetic body 43 and converts it into an electrical signal. The encoder sensor 81 is disposed adjacent to the magnetic body 43 and converts the change in the magnetic field generated during the rotation of the magnetic body 43 into the electrical signal.

Specifically, the encoder sensor 81 is provided with a hall sensor therein, and converts a strength of the magnetic field changing as the magnetic body 43 (which may be in the form of a shaft-end mount) disposed in close proximity to the hall sensor rotates into the electrical signal.

The hall sensor may output a waveform signal (Sin/Cos waveform) as shown in FIG. 11 from the strength of the detected magnetic field. This hall sensor may measure an angle change of the magnetic body 43 even at a speed of 0 to 60,000 rpm.

In addition, the encoder sensor 81 may digitally modulate the waveform signal to acquire a digital signal (square wave) in the form of an ABZ signal as shown in FIG. 12, and this digital signal (square wave, etc.) may be used as an input value to derive the rotation angle of the roller 40.

As such, the electrical signal generated by the encoder sensor 81 is transferred to the controller 90. In this case, the controller 90 may calculate the traveling speed and traveling distance of the roller 40 based on the electrical signal received from the sensing unit 80.

Specifically, the frequency of the waveform changes according to the rotation speed of the roller 40 (the movement speed of the portable printer 1). If the travel speed is high, the period of the waveform signal becomes shorter, and the frequency becomes higher, and conversely, if the traveling speed is slow, the period becomes longer and the frequency becomes lower. The controller 90 may determine the movement speed of the portable printer 1 by detecting the period in the waveform signal of the encoder sensor 81.

In addition, the controller 90 may calculate the traveling direction of the roller 40 from the electrical signal received from the sensing unit 80. For example, the controller 90 compares two signals (Bx, By) related to N/S poles of the magnetic body 43 and determines that the roller 40 rotates forward when a phase A is ahead of a phase B and that the roller 40 rotates reversely when the phase B is 90 degrees ahead of the phase A. In other words, the controller 90 may detect the forward or reverse rotation of the roller 40 by detecting the phase of the two signals included in the electrical signal.

The sensing unit 80 of the present disclosure uses the encoder sensor 81 described above, which has straightness as a magnetic encoder and has a constant quality of a sensing value despite the difference in the properties of the bottom surface. In addition, the magnetic encoder may check whether the reverse rotation is made, the traveling distance of the roller 40 may be determined according to the number of N/S counting, and the speed change of the roller 40 may be checked according to the number of N/S counting per hour.

In this embodiment, the speed change of the roller 40 corresponds to the change in the printing speed, and according to this embodiment including the encoder sensor 81, when an image is printed in line units (pixels), it is possible to accurately detect a change in the speed at which lines should be sprayed (printing speed). Through this, the present embodiment may control a discharge amount (discharge speed) per unit time of the printing material to exclude distortion of the image.

The controller 90 controls the delivery of the printing material by the nozzle 22 based on the sensing value of the sensing unit 80. The controller 90 may determine the rotation speed of the roller 40 using an electrical signal that is the sensing value, and the controller 90 may control the discharge amount of the printing material per moving distance to be constant by increasing the delivery amount of the printing material when the rotation speed of the roller 40 is high and reducing the delivery amount of the printing material when the rotation speed of the roller 40 is slow.

The controller 90 may control a printing start position using the traveling distance of the roller 40. Here, the printing start position means when the roller 40 rotates in the forward direction for a certain distance after the printing button 13B is pressed and printing starts. In this case, the certain distance may be set arbitrarily, but for example, when printing is set to proceed from a circumference of the portable printer 1, it may be set to a distance corresponding to the interval between the nozzle 22 and the circumference of the portable printer 1.

For example, an initial travel distance which is the certain distance may preferably be 25 mm to 30 mm (about 28 mm), which is the distance between the nozzle 22 and the circumference of the portable printer 1. Since the roller 40 moving a distance of 1 mm may correspond to about 11.5 pulses in the encoder sensor 81, when 320 pulses are confirmed after the roller 40 starts rotation, the controller 90 may control the nozzle 22 so that the printing starts.

In other words, the controller 90 may determine whether the portable printer 1 has reached the printing start position by recognizing whether the roller 40 has moved by a certain distance using the sensing value.

Therefore, the controller 90 causes the printing material to be discharged from the nozzle 22 after the roller 40 rotates the certain distance, so that the portable printer 1 prints from the set starting point.

In other words, the controller 90 serves to receive a sensed position value of the roller 40 and generate the printing signal so that printing data divided into columns can start to be output at the correct position.

On the other hand, a printing end position is not set separately, but is automatically determined according to the printing start position and image. The discharge of the printing material starts from the printing start position, and when the transmission and output of the printing data are completed, the printing ends at that point.

In addition, the controller 90 may ensure the resolution of the image by allowing delivery of the printing material of the nozzle 22 to be adjusted based on the traveling distance of the roller 40. The controller 90 calculates the traveling distance of the roller 40 based on the electrical signal converted by the sensing unit 80, calculates the length of the image corresponding to the traveling distance of the roller 40 in the image for printing, and then controls the printing material to be delivered to the target by the nozzle 22 by the calculated length of the image.

In particular, this embodiment does not directly sense the speed value of the roller 40, but calculates the traveling distance of the roller 40 according to the electrical signal (digital signal, etc.) according to the rotation of the magnetic body 43, and accordingly causes the printing material to be discharged based on image data as much as the image length (pixel data).

For this control, the controller 90 may include a control unit 91, an imaging unit 92, and a printing unit 93 as shown in FIG. 14.

The control unit (MCU) 91 receives the electrical signal from the encoder sensor 81. The control unit 91 may receive a digital signal as shown in FIG. 12, and based on such an electrical signal, the traveling direction, the traveling speed, and the traveling distance of the roller 40 may be determined. Of course, as mentioned above, the traveling speed determined by the control unit 91 may mean a change in speed, not an absolute value of speed. In addition, the control unit 91 generates the printing signal based on the electrical signal received from the sensing unit 80 and the image to be printed on the target, and transfers it to the imaging unit 92. For reference, the printing signal may include an electrical signal transferred by the sensing unit 80 to the control unit 91.

The imaging unit (FPGA) 92 generates the printing data based on the image selected by the user for printing and the printing signal received from the control unit 91. The printing data may refer to data obtained by arithmetic processing of an image (image for printing) to a value optimized for printing. Specifically, the imaging unit 92 may extract the printing data for output by calculating an image based on the printing signal and the electrical signal received from the control unit 91, an image processing signal, and the like.

For example, the imaging unit 92 may generate the printing data by performing an operation to extract the image data corresponding to the length of the image in consideration of the traveling speed and travel distance of the roller 40. This extraction of the image data may be repeated in real time, and the generated printing data is utilized for discharging the printing material by the cartridge 20.

The printing signal generated by the control unit 91 and the printing data generated by the imaging unit 92 are transferred to the printing unit 93. The printing unit (ASIC) 93 is a component configured to control the nozzle 22 of the cartridge 20 and may directly control the discharge of the printing material by the nozzle 22.

By controlling the nozzle 22 according to the printing signal and the printing data, the printing unit 93 may allow an image of a certain length to be printed on the target in correspondence with the traveling distance of the roller 40. In other words, the controller 90 receives the sensed position value of the roller 40 and generates the printing signal so that the printing data divided into columns can be output at the correct position according to timing. Therefore, in this embodiment, even when the movement of the portable printer 1 on the surface of the target is not uniform, the image may be prevented from stretching or distortion, so that a certain level or more of image resolution can be guaranteed.

In other words, in this embodiment, the output value of the encoder sensor 81 (the sensing value corresponds to the rotation angle of the roller 40, which may be an electrical signal such as a digital signal of FIG. 12) is calculated, the sensing value is transferred to the control unit 91, and the imaging unit 92 processes image data transmission based on the sensing value of the encoder sensor 81 (a signal corresponding to the rotation angle of the roller 40). Thereafter, the printing unit 93 controls the output of the cartridge 20 based on the image data received from the imaging unit 92, and a high-resolution printing is performed.

In other words, in this embodiment, since the rotation angle of the roller 40 is detected in real time and the printing material is sprayed by transmitting (pixel) printing data for each unit travel distance, the amount of sprayed printing material per unit time is increased when the rotation speed of the roller 40 is high. Therefore, this embodiment may ensure high resolution by controlling a certain amount of spraying per printing area (distance).

In addition, the controller 90 recognizes the rotation direction of the roller 40 using the electrical signal transferred from the sensing unit 80. Specifically, referring to FIG. 11, the magnetic field strength in the two axis (x, y) directions is detected according to the rotation direction of the magnetic body 43, and the two waveforms are 90 degrees ahead or behind according to the rotation direction.

In FIG. 11, an electrical signal may occur in which the phase A is 90 degrees ahead of the phase B when the rotation direction of the roller 40 is in the forward direction, and conversely, the phase B is 90 degrees ahead of the A phase when the rotation direction of the roller 40 is in the reverse direction. Of course, in the present disclosure, the relationship between the degree of advance of the phase A and the phase B described above and the direction of rotation of the roller 40 may be reversed.

Accordingly, the controller 90 may determine whether the rotation of the roller 40 is forward or reverse using the electrical signal, and when the roller 40 rotates in the reverse direction, may control not to print or restrict rotation of the roller 40. In addition, when the reverse rotation of the roller 40 is detected, the controller 90 may transmit a notification signal to the user using the display unit 130.

In addition, the roller 40 may be structurally provided to be rotatable in only one direction. In this case, the controller 90 may omit the detection and notification of the rotation direction of the roller 40 through the electrical signal.

Hereinafter, referring to FIG. 13, a printing operation by the controller 90 is described.

When the user contacts the portable printer 1 to the surface of the target and moves the portable printer 1 in one direction on the surface of the target, the roller 40 rotates due to friction with the target. At this time, the magnetic body 43 also rotates, and the sensing unit 80 may detect the rotation of the roller 40 by detecting the rotation of the magnetic body 43.

The sensing unit 80 and the controller 90 may check whether the rotation direction of the roller 40 is appropriate based on the rotation of the magnetic body 43. When the roller 40 rotates in the reverse direction, the user may be notified of a printing failure and an error, and the display unit 130 may be utilized at this time.

When the roller 40 rotates in the forward direction, the controller 90 continuously checks the traveling distance of the roller 40 based on the sensing value. Here, when it is detected that the roller 40 has reached the set printing start position (point), printing by the nozzle 22 of the cartridge 20 may begin.

When the portable printer 1 is continuously moving on the surface of the target and printing is performed, the sensing unit 80 checks the traveling distance (rotation angle) of the roller 40. Through this, the controller 90 generates image data (pixel data) according to the traveling distance of the roller 40 and controls the cartridge 20 based on the image data.

In FIG. 13, the steps of sensing the traveling distance of the roller 40 and spraying the printing material (ink) after transmitting the image data may be performed repeatedly until all images are printed.

For example, when the transmission of the image data from the imaging unit 92 of the controller 90 is completed, the controller 90 may recognize the end of printing. When printing of the image is finished, the controller 90 may inform the user of this using the display unit 130 or the like.

As described above, the controller 90 uses the sensing unit 80 to check the rotation angle of the roller 40 and delivers the printing data that should be output to the position where the roller 40 moves, so that an image of an appropriate length corresponding to the distance traveled by the roller 40 in the printing process is printed. Thus, in this embodiment, even if the portable printer 1 manually operated by the user does not have a uniform speed, a high-resolution image may be printed.

In other words, this embodiment implements the transmission of pixel data and the subsequent spraying of the printing material, and the imaging unit 92 sequentially may receive the pixel data according to the moving distance of the roller 40 and may be used for the spraying of the printing material. Alternatively, the imaging unit 92 may receive and store (temporarily) the pixel data at a time, and may perform the spraying of the printing material according to a portion corresponding to the moving distance of the roller 40 in the pixel data.

Hereinafter, referring to FIG. 14 and the like, the communication unit 100 and the storage 110 included in the portable printer 1 according to the first embodiment of the present disclosure are described.

The communication unit 100 may receive an image to be printed on the target from the outside. The communication unit 100 may be provided as a USB terminal and wired, or may be provided as a Bluetooth module, a WIFI transceiver, or the like, and may be wirelessly connected.

In other words, the communication unit 100 may receive the image to be printed on the target from an external device (the user terminal 210, a server 220, etc.) through wired and wireless communication.

The storage 110 may store the image to be printed on the target. The storage 110 may be in charge of transmitting the image in conjunction with the communication unit 100. In other words, in this embodiment, at least one of the image received by the communication unit 100 and the image stored in the storage 110 may be used.

The present disclosure may basically use the image received by the communication unit 100, in which case the image may pass through a volatile memory (SDRAM) of the storage 100. On the other hand, when the image transmitted through the communication unit 100 remains stored in a non-volatile memory (FLASH #1) of the storage 100, the image stored in the storage 100 may be used for printing without receiving any image by the communication unit 100.

The image stored in the storage 110 by the communication unit 100 may be modified or updated. In addition, when it is difficult to use the communication unit 100 according to a printing environment of the portable printer 1 or when the use of the communication unit 100 is intentionally excluded, the image stored in the storage 110 (especially the non-volatile memory) may be used for printing.

In addition to storing the image, the storage 110 may store various kinds of data for processing the image and implementing printing. For example, a part of the storage 110 (SDRAM, FLASH #1) may be used for programming and image data processing of the control unit 91 when printing as a memory for operation of the control unit 91 of the controller 90. In addition, another part (FLASH #2) of the storage 110 is a memory for operation of the imaging unit 92 of the controller 90 and may be used to store internal logic control data of the imaging unit 92.

Hereinafter, a portable printing system 200 including the above-described portable printer 1 will be described.

Figure 15:
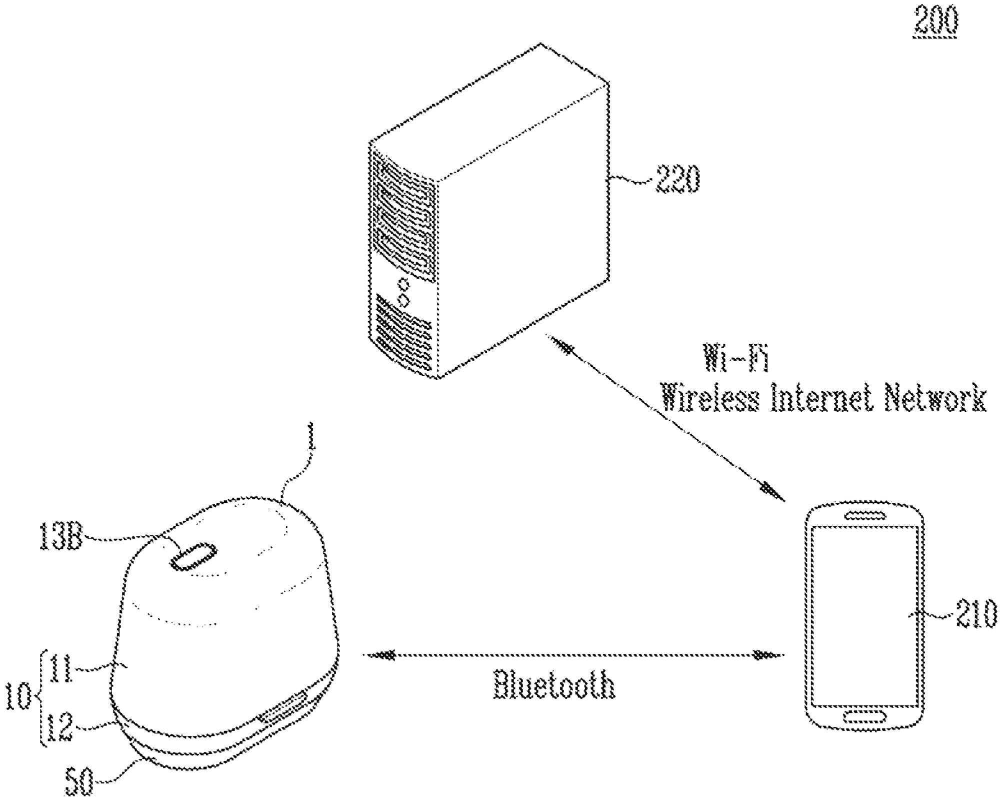
FIG. 15 is a schematic diagram of a portable printing system according to the first embodiment of the present disclosure.
Figure 16:
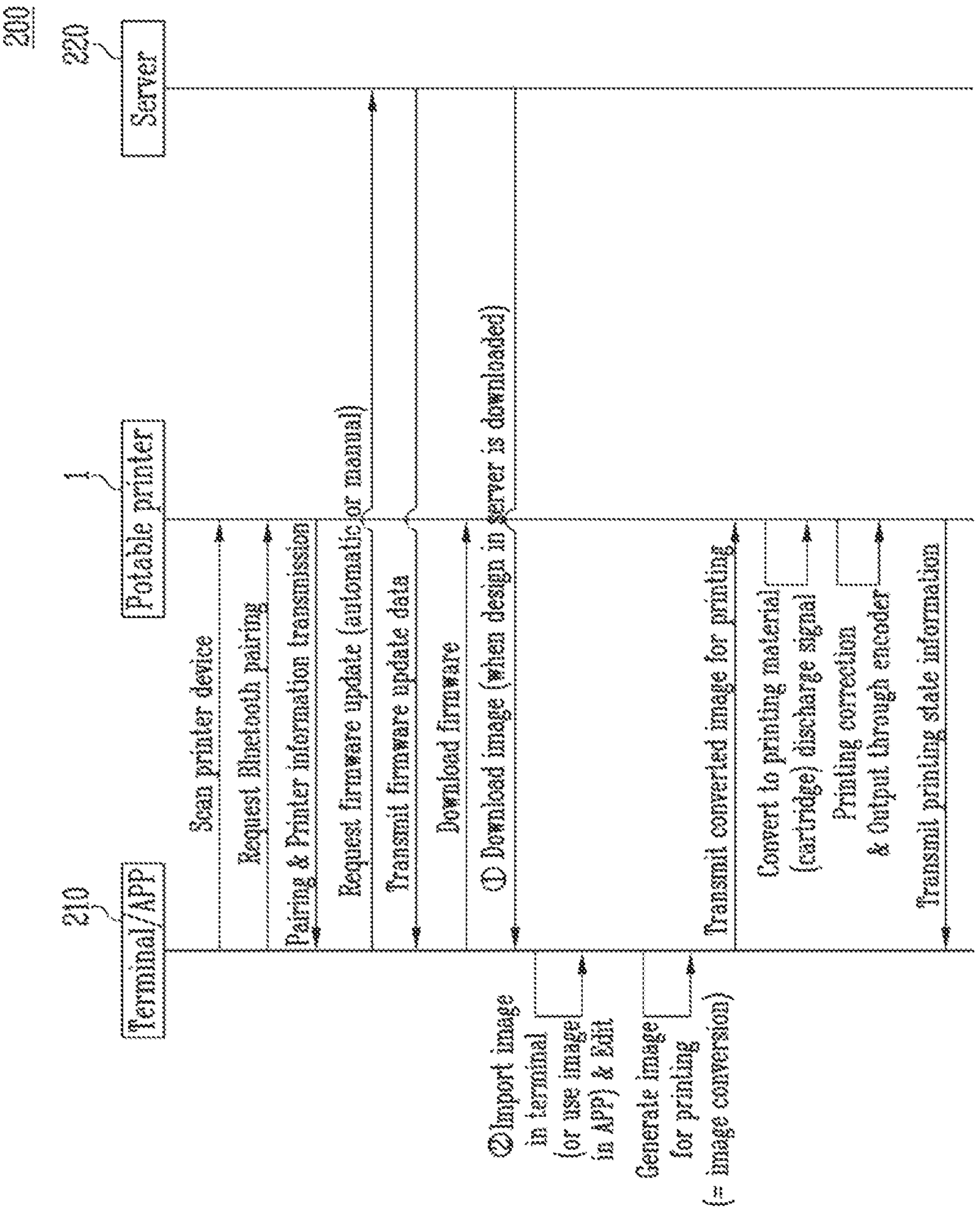
FIG. 16 is a flowchart of the portable printing system according to the first embodiment of the present disclosure.

FIG. 15 is a schematic diagram of the portable printing system 200 according to the first embodiment of the present disclosure, and FIG. 16 is a flowchart of the portable printing system 200 according to the first embodiment of the present disclosure.

Referring to FIGS. 15 and 16, the portable printing system 200 according to the first embodiment of the present disclosure includes the portable printer 1 and the user terminal 210. The portable printing system 200 may operate in conjunction with the server 220 or may include the server 220.

Referring to FIG. 15, the portable printer 1 and the user terminal 210 may communicate wired or wirelessly, and may use Bluetooth, for example. Of course, the communication method between the portable printer 1 and the user terminal 210 is not limited.

In addition, in the portable printing system 200, the user terminal 210 may communicate with the server 220 wired and wireless, and may use an Internet network such as Wi-Fi. The communication between the user terminal 210 and the server 220 may be limited if necessary.

Hereinafter, referring to FIG. 16, a printing sequence of the portable printing system 200 is described.

First, the user may connect the portable printer 1 using the user terminal 210. The user terminal 210 may scan the portable printer 1 placed in the vicinity using a dedicated application (APP) for operating the portable printer 1 or a Bluetooth function of the user terminal 210. The user terminal 210 may notify the user when the accessible portable printer 1 is detected, and may transmit a connection request signal (Bluetooth pairing) to the portable printer 1 after receiving confirmation from the user.

The portable printer 1 may allow a communication connection of the user terminal 210 based on the connection request signal received from the user terminal 210. The portable printer 1 may check user terminal information included in the connection request signal transferred from the user terminal 210 and, in the case of a legitimate user terminal 210, return a connection permission signal to implement the connection (pairing). In this case, the portable printer 1 may transfer printer information necessary for the user to use the printing to the user terminal 210, and the user terminal 210 may display the portable printer 1 information.

The printer information may include basic information (Bluetooth name, firmware version, model name, S/N, MAC address, etc.) of the portable printer 1, and may further include information such as a battery level, printing material level, and up and down mode.

However, the connection between the user terminal 210 and the portable printer 1 may be simplified when connected repeatedly. In other words, at the time of the first connection, the connection request signal is transferred from the user terminal 210 to the portable printer 1 with the confirmation from the user, but in the connection after the second time, the user terminal 210 may automatically connect the portable printer 1 when an APP for printing starts. In this case, the portable printer 1 that is automatically connected may have been connected to the user terminal 210 at least once.

The user terminal 210 to which the portable printer 1 is connected may request a firmware update confirmation to the server 220. In other words, the user terminal 210 may check whether firmware update is required for the portable printer 1 while transferring the printer information received from the portable printer 1 to the server 220.

The check of the firmware update uses the connection with the server 220, and the user terminal 210 may automatically communicate with the server 220 when the portable printer 1 is connected to check the firmware update.

Alternatively, the user terminal 210 may request the firmware update to the server 220 only when there is the user's request even if the portable printer 1 is connected. Alternatively, the user terminal 210 may deliver the firmware update to the server 220 only when a certain period of time has elapsed.

Alternatively, the user terminal 210 may update the firmware of the portable printer 1 using the APP for printing, but may not use a step of requesting a separate firmware update to the server 220. In this case, when the printing APP is updated in the user terminal 210, as firmware data is embedded in the APP, data for firmware update may be transferred to the user terminal 210. Therefore, when the user terminal 210 is connected to the portable printer 1 after the printing APP of the user terminal 210 is updated, the firmware update of the portable printer 1 may be performed automatically.

The firmware update data received by the user terminal 210 from the server 220 is downloaded to the portable printer 1. Thus, the portable printer 1 may perform the firmware update using the firmware update data delivered from the user terminal 210. However, since the portable printer 1 and the user terminal 210 may use a Bluetooth connection, when the firmware update data is delivered to the portable printer 1, the user terminal 210 may display a guide to place the portable printer 1 at a location adjacent to the portable printer 1.

Thereafter, the present disclosure secures the image for printing. This can be accomplished by at least one of the two methods. The first method is to download the image to the user terminal 210 through the server 220. The user searches for a printable image in the server 220 using the printing APP of the user terminal 210, and then when the user selects a desired image, the image may be transmitted from the server 220 to the user terminal 210.

In this case, image transmission from the server 220 to the user terminal 210 may be performed through an online service provided for a fee or free of charge. In addition, in addition to the image selected by the user to print, the user terminal 210 may receive an store images from the server 220 in a bundle, and use them later.

In the second method, printable images may be embedded in the user terminal 210 during installation of the printing APP, and any one of the embedded images may be selected by the user. Alternatively, any one of the images previously stored in the user terminal 210 may be selected, delivered to the printing APP, and used for printing.

The image included in the printing APP may be easy to print using the nozzle 22 of the cartridge 20, but the image stored in the user terminal 210 regardless of the printing APP may not be suitable for printing by the nozzle 22. Therefore, when an image stored in the user terminal 210 is selected, the printing APP may perform pixel processing (correction of resolution, color, brightness adjustment, etc.) to convert the selected image to a state suitable for printing.

The printing APP installed in the user terminal 210 may provide an image editing function. Image editing may include cropping, resize, and adjustment of brightness, saturation, and color.

Furthermore, the user terminal 210 may upload an image for printing to the server 220. In this case, the user may correct the image to a form optimized for printing using the user terminal 210 and then transmit it to the server 220, and when another user downloads the image from the server 220, the user who created the image may generate revenue.

The user terminal 210 converts the image (original) selected by the user from the embedded image or the image transferred from the server 220 into an image (for printing) that can be printed pixel-by-pixel through the nozzle 22. Specifically, in the present embodiment, in order to directly use the original image for printing, a color conversion operation and a data compression operation may be performed in the printing APP, and the printing APP may convert an original image file such as JPG into an image file for printing in BMP form.

The printing APP converts RGB digital colors of the image into CMY colors for the cartridge 20 by the color conversion operation. Since the nozzle 22 of the cartridge 20 uses CMY rather than RGB as the printing material, the printing APP may convert the color of the image to be suitable for printing.

After that, the printing APP compresses the data of the image. Specifically, the printing APP converts the original data of the image into dots through a Halftone image operation for printing of the cartridge 20, and image sampling is performed according to a set DPI. For example, the printing APP may arbitrarily reduce the resolution of the image in consideration of the size of the hole through which the printing material is discharged from the nozzle 22.

The user terminal 210 may transfer the converted image for printing to the portable printer 1 through the printing APP. In this case, the portable printer 1 may generate the printing signal for processing the image for printing using the controller 90.

In addition, as described above, the present embodiment may detect the traveling distance of the roller 40 using the encoder sensor 81 and correct the printing signal accordingly. Therefore, in the process of moving the portable printer 1 along the surface of the target, the image may be printed without distortion.

The portable printer 1 may notify the user of printing state information through the display unit 130 provided in the portable printer 1 during printing or when printing is completed, and may also transmit the printing state information to the user terminal 210. The printing state information may include a printing operation state and a printing error state (communication error, contact failure of the cartridge 20, non-insertion of the cartridge 20, etc.), but in addition, may include all information that the user can refer to in the printing process.

The printing process is summarized as follows. When the user selects or edits an image in the printing APP and presses a printing start button of the printing APP, image conversion is performed on the printing APP. When the image conversion is completed, the image for printing is transmitted to the portable printer 1 via Bluetooth.

The portable printer 1, which receives the image for printing and is ready for printing, may enter a printing mode from a standby mode by pressing the printing button 13B (one time) by the user. Here, when the user places the portable printer 1 on the surface of the target and moves, the controller 90 detecting the rotation of the roller 40 may sequentially output images from the cartridge 20.

When the printing of the portable printer 1 is completed, a printing completion alarm may be displayed on the portable printer 1 and the user terminal 210. Here, the user may separate the portable printer 1 from the surface of the target, and the portable printer 1 may enter the standby mode again.

Hereinafter, second to fifth embodiments of the present disclosure will be described. The second to fifth embodiments of the present disclosure may further include tuning an image in consideration of the color of the target compared to the first embodiment.

Figure 17:
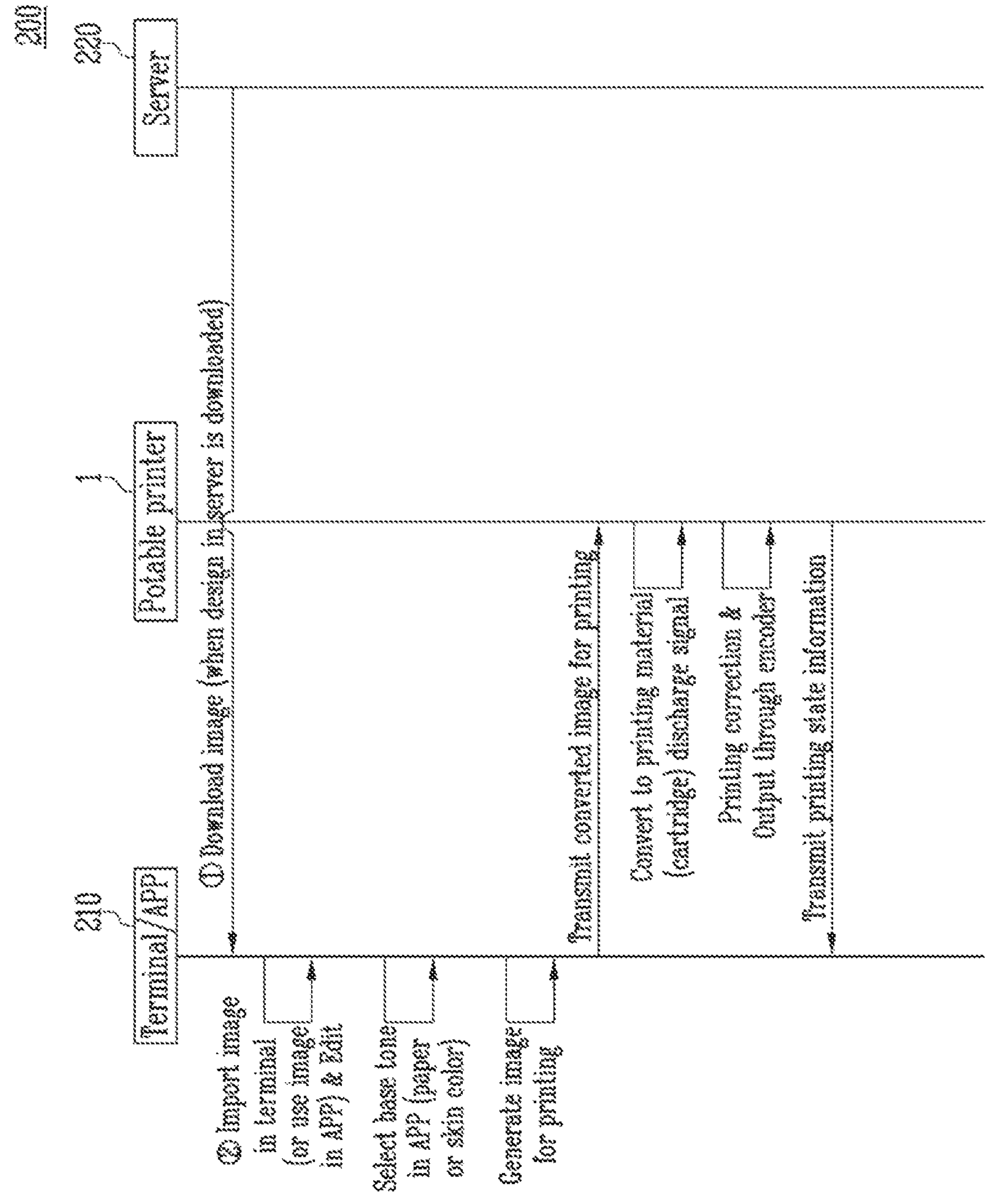
FIG. 17 is a flowchart of a portable printing system according to a second embodiment of the present disclosure.

FIG. 17 is a flowchart of a portable printing system 200 according to the second embodiment of the present disclosure.

Hereinafter, the description will focus on differences of this embodiment compared to the previous embodiment, and parts omitted from explanation will be replaced with the previous descriptions. It should be noted that this also applies to the third to fifth embodiments.

Referring to FIG. 17, the portable printing system 200 according to the second embodiment of the present disclosure may allow the user terminal 210 to receive target information by the user. In this case, the target information includes at least one of the hardness of the target and the color of the target. In other words, the target information includes information about whether the target is paper or skin. Furthermore, in this embodiment, in particular, the user terminal 210 may receive a color tone of the target. In other words, when the target is skin, the user terminal 210 may receive information on the skin color (skin tone) as the target information. For example, the color tone of the target may be predefined to be divided into White (Paper)/White (skin)/Asian/Hispanic/Dark/Black, and the user may select any one.

As described above, the user terminal 210 may convert the original image into the image for printing using the printing APP, and the target information may be reflected at this time. For example, the brightness and saturation of the image may be adjusted according to the light or dark degree of the skin tone, and an image for printing may be generated through the color conversion and data compression. For reference, the image for printing to which the target information is reflected in the present specification may be referred to as a corrected image.

The operation after the user terminal 210 generates the image for printing is as described in the previous embodiment. In other words, in contrast to the previous embodiment, the printing APP may receive input (selection) of the color tone of the target or the printing target (paper or skin), and the user terminal 210 may have an additional function of performing image correction accordingly. Through this, this embodiment may print the image more clearly when printing on skin having various colors.

In this embodiment, the image correction may be performed by automatically recognizing the color tone of the target or the printing target (paper or skin), and the mode detector 70 may be utilized at this time. In other words, in this embodiment, the target information (whether the target is soft or hard) may be automatically identified by detecting the up and down mode of the nozzle 22, and then the target information may be reflected when the printing APP processes the image.

In addition, this embodiment utilizes automatic recognition of the target to prepare for the case where the target information input to the printing APP by the user and the actual target information do not match. When the input target information and the automatically recognized target information are different, the portable printer 1 may notify the user of this fact.

Figure 18:
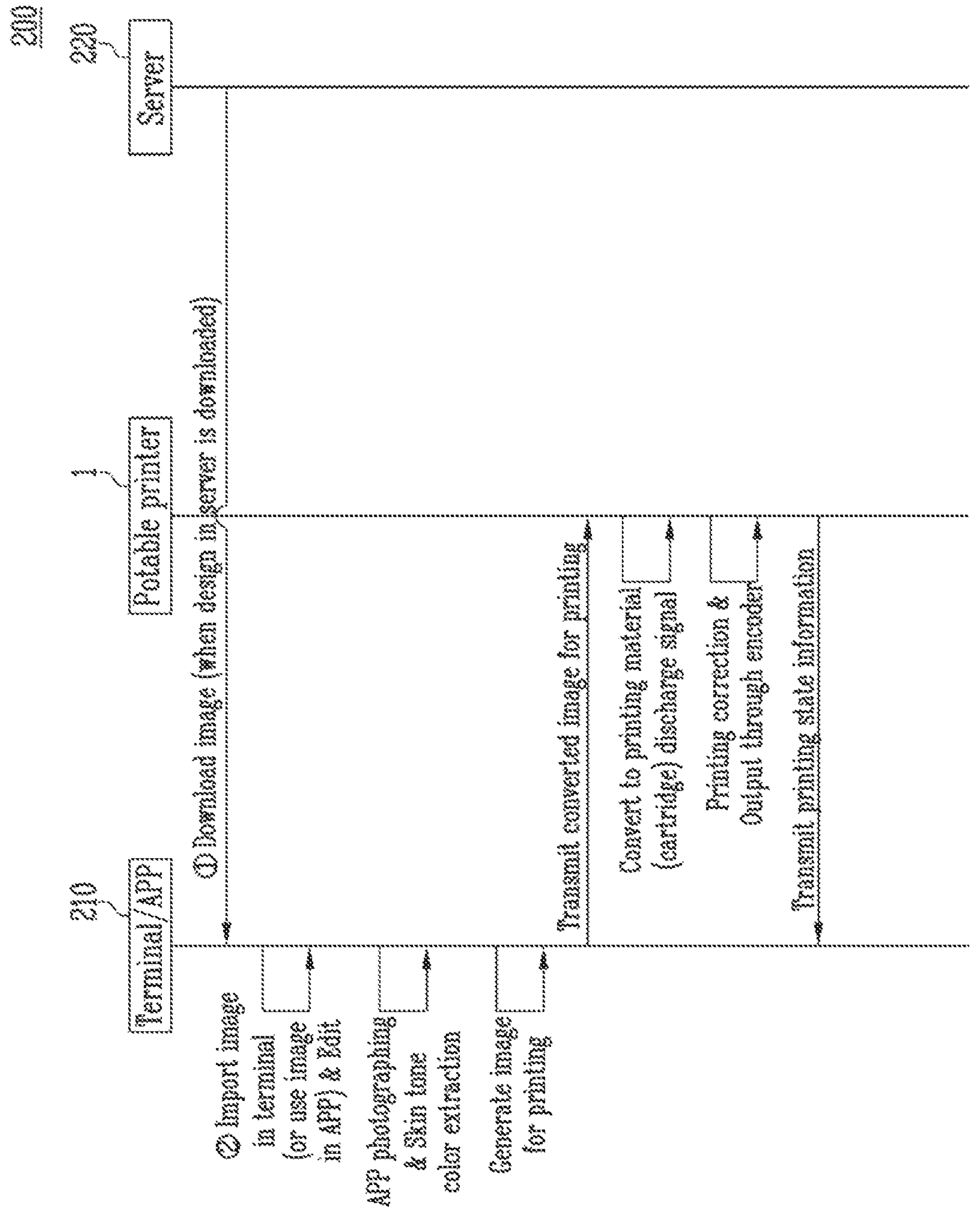
FIG. 18 is a flowchart of a portable printing system according to a third embodiment of the present disclosure.

FIG. 18 is a flowchart of the portable printing system 200 according to the third embodiment of the present disclosure.

Referring to FIG. 18, unlike the second embodiment in which the user inputs the color tone of the target to the printing APP, the portable printing system 200 according to the third embodiment of the present disclosure may allow the user terminal 210 to actively recognize the color tone of the target using a camera or the like.

In this embodiment, the user terminal 210 may photograph the target using a built-in camera, and the user terminal 210 may extract information of the target from a target image using the printing APP or a separate program.

Therefore, in this embodiment, when the user photographs the surface of the target to be printed using the user terminal 210, the color tone of the target may be automatically reflected when converting the image for printing.

In this case, the user terminal 210 directly acquires information of the target without relying on the input of the user, so that a more appropriate image may be printed.

In addition to using the camera of the user terminal 210, the present embodiment may utilize various sensors that may be provided in the user terminal 210.

Figure 19:
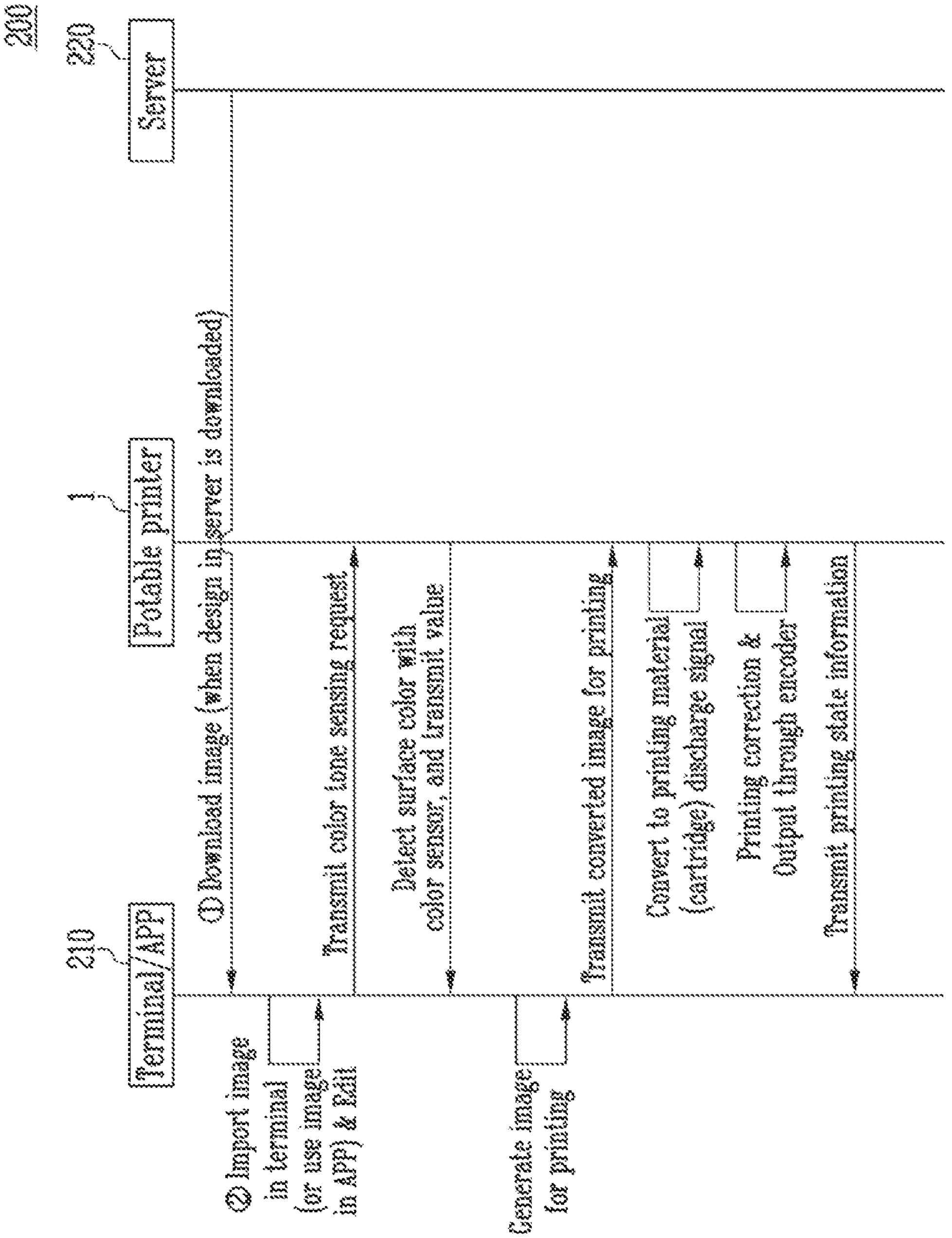
FIG. 19 is a flowchart of a portable printing system according to a fourth embodiment of the present disclosure.

FIG. 19 is a flowchart of the portable printing system 200 according to the fourth embodiment of the present disclosure.

Referring to FIG. 19, the portable printing system 200 according to the fourth embodiment of the present disclosure directly acquires information of the target as in the previous third embodiment, but the present embodiment is different from the third embodiment in that the portable printer 1 acquires the information of the target.

In this embodiment, after the user terminal 210 and the portable printer 1 are connected by Bluetooth, etc., when a sensing request for the color tone of the target is transmitted by the user terminal 210 to the portable printer 1, the portable printer 1 may scan the surface of the target.

When the image to be printed is selected by the user, the user terminal 210 may automatically instruct the portable printer 1 to scan the surface of the target. Alternatively, when the user terminal 210 and the portable printer 1 are connected via Bluetooth, the portable printer 1 may automatically start scanning the target. Here, the portable printer 1 may display a notification that the scan of the target is started so that the user can place the portable printer 1 adjacent to the target.

The portable printer 1 may be equipped with a color sensor (not shown), and may detect the color tone of the target using the color sensor. A sensing value of the color sensor is transferred from the portable printer 1 to the user terminal 210, and the user terminal 210 generates an image for printing by referring to the color tone of the target, as described above.

The portable printer 1 of the present embodiment may have the camera as described in the preceding embodiment, but in consideration of portability and program processing load of the portable printer 1, it may be desirable to use the color sensor in this embodiment.

Figure 20:
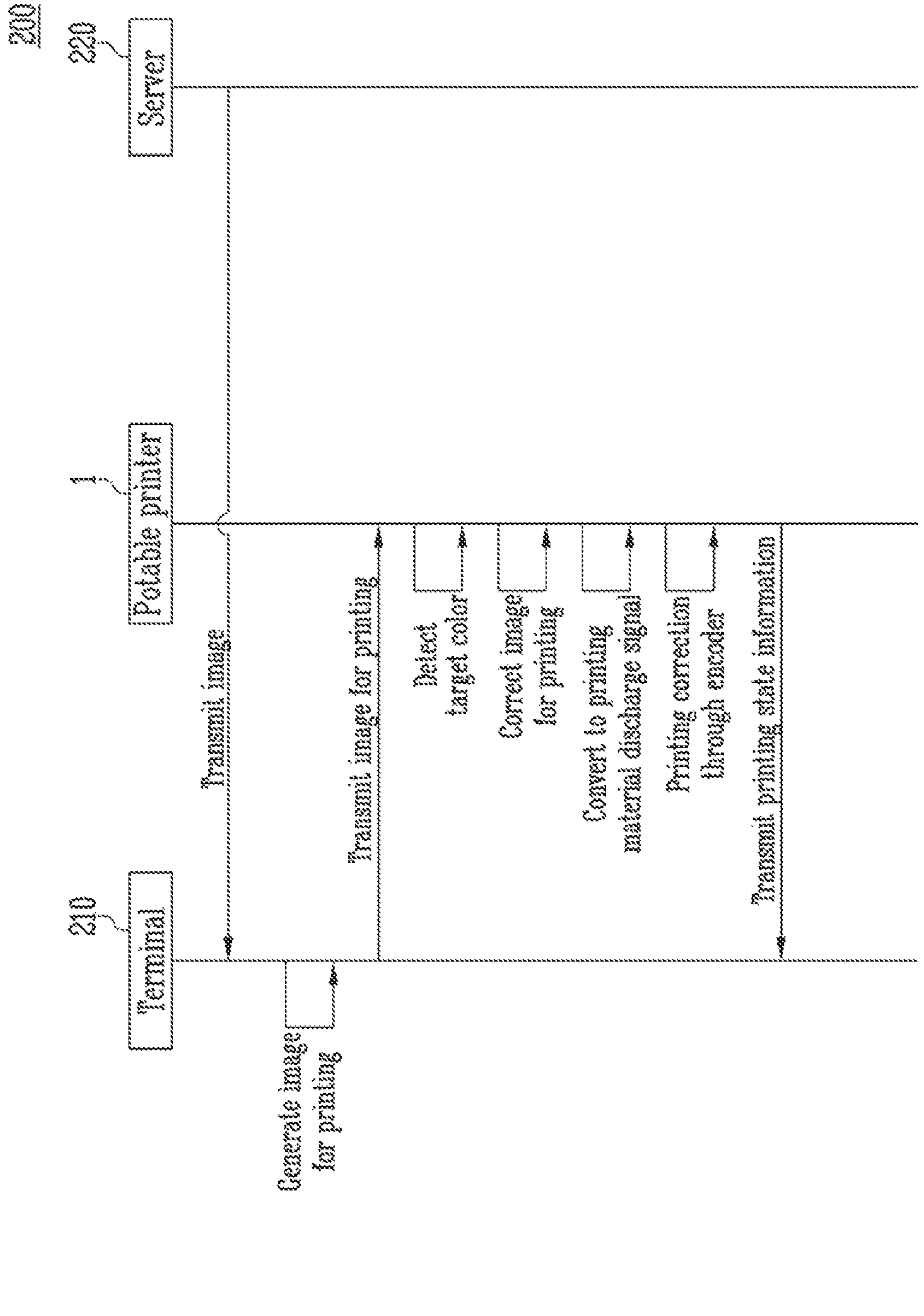
FIG. 20 is a flowchart of a portable printing system according to a fifth embodiment of the present disclosure.

FIG. 20 is a flowchart of the portable printing system 200 according to the fifth embodiment of the present disclosure.

Referring to FIG. 20, the portable printing system 200 according to the fifth embodiment of the present disclosure may process most of the functions described in the previous embodiments by the portable printer 1 itself.

For example, the portable printer 1 receives an image transferred from the user terminal 210, wherein the transmitted image may be a printing image that has undergone the color conversion and data compression. Thereafter, the portable printer 1 may detect the color tone of the target with the color sensor.

The portable printer 1 may correct the image for printing by combining the image for printing with the color tone of the target. For the preceding second to fourth embodiments, the color tone of the target is reflected when converting the image to the image for printing in the printing APP of the user terminal 210, whereas in this embodiment, the portable printer 1 may perform correction in consideration of the color tone of the target for the image for printing generated by the user terminal 210.

In other words, the preceding second embodiment and the like proceed in the order of image selection→input/detection of target color tone→generation of image for printing→transmit from the user terminal 210 to the portable printer 1→printing start. On the other hand, the present embodiment proceeds in the order of image selection→generation of image for printing→transmit from the user terminal 210 to the portable printer 1→detection of target color tone→correction of image for printing→printing start.

Furthermore, in this embodiment, generation of the image for printing may also be processed in the portable printer 1. In other words, in the present disclosure, the controller 90 of the portable printer 1 may process at least the color conversion during the color conversion and data compression.

In this case, the present embodiment may proceed in the order of image selection→transmit from the user terminal 210 to the portable printer 1→detection of target color tone→generation of image for printing→printing start.

However, the image may also be stored in the storage 110 of the portable printer 1, and in this case, the image stored in the storage 110 may be an image for printing in which color conversion has already been processed. Therefore, the present embodiment may proceed in the order of selection of image for printing→detection of target color tone→correction of image for printing→printing start (in the portable printer 1). In this case, data processing by the user terminal 210 may be omitted.

The present disclosure is not limited to the embodiments described above, and may include a combination of at least two or more of the above embodiments or a combination of at least one of the above embodiments and a known technology as a new embodiment.

While the present disclosure has been described in detail with reference to specific embodiments thereof, they are only to specifically explain the present disclosure and the present disclosure is not limited thereto. It will be apparent that variations or improvements 5 are possible by those skilled in the art within the technical spirit of the present disclosure.

All simple variations or modifications of the present disclosure fall within the scope of the present disclosure, and the specific scope of protection of the present disclosure will be clarified by the appended claims.

The invention claimed is:

1. A portable printer comprising:

a main body in a portable form configured to accommodate a cartridge comprising a nozzle that prints an image by delivering a printing material to a target having a soft or hard surface;

a seating part that is provided to be exposed to an outside from a lower portion of the main body to face a surface of the target and surround the nozzle at least partially;

a roller provided at each of a front and a rear of the nozzle at the lower portion of the main body, based on a direction in which the main body moves along the surface of the target to deliver the printing material to the target; and a controller configured to control delivery of the printing material by the nozzle, wherein a plurality of the nozzles are provided and comprise a first nozzle and a second nozzle of different sizes, wherein the controller is configured to control the printing material to be delivered by the first nozzle and the second nozzle, and control the printing material to be delivered by the first nozzle among the first and second nozzles, and wherein the controller is configured to variably control the plurality of nozzles through which the printing material is discharged according to a position of the seating part.

2. The portable printer of claim 1, wherein the first nozzle and the second nozzle are alternately arranged in a head of the cartridge.

3. The portable printer of claim 1, wherein a discharge hole of the first nozzle is larger than a discharge hole of the second nozzle.

4. The portable printer of claim 1, further comprising a printing adjustment unit configured to adjust a height difference between the nozzle and the surface of the target by adjusting a height difference between the nozzle and the roller.

5. The portable printer of claim 4, wherein the printing adjustment unit is configured to adjust the height difference between the nozzle and the surface of the target by moving the roller in inner and outer directions of the main body to adjust the height difference between the nozzle and the roller.

6. The portable printer of claim 5, wherein the printing adjustment unit is configured to move the seating part in the inner and outer directions of the main body, and wherein the roller is configured to move integrally with the seating part.

7. The portable printer of claim 6, further comprising a mode detector configured to detect the height difference between the nozzle and the surface of the target by detecting the position of the seating part, wherein the mode detector is configured to detect a first mode in which the nozzle and the surface of the target form a first height or a second mode in which the nozzle and the surface of the target form a second height greater than the first height according to the position of the seating part.

8. The portable printer of, claim 6, wherein the controller is configured to control the printing material to be delivered by the first nozzle and the second nozzle in a first mode in which the nozzle and the surface of the target form a first height, and control the printing material to be delivered by the first nozzle in a second mode in which the nozzle and the surface of the target form a second height greater than the first height.

9. The portable printer of claim 1, wherein the printing material is a printing solution having a viscosity of 4 mPa*s to 6 mPa*s.

10. A portable printer comprising:

a main body in a portable form configured to accommodate a cartridge comprising a nozzle that prints an image by delivering a printing material to a target having a soft or hard surface;

a seating part that is provided to be exposed to an outside from a lower portion of the main body to face a surface of the target and surround the nozzle at least partially;

a roller provided at each of a front and a rear of the nozzle at the lower portion of the main body, based on a direction in which the main body moves along the surface of the target to deliver the printing material to the target;

a controller configured to control delivery of the printing material by the nozzle; and a printing adjustment unit that is configured to adjust a height difference between the nozzle and the surface of the target by moving the roller in inner and outer directions of the main body to adjust a height difference between the nozzle and the roller, wherein a plurality of the nozzles are provided and comprise a first nozzle and a second nozzle of different sizes, wherein the controller is configured to control the printing material to be delivered by the first nozzle and the second nozzle, and control the printing material to be delivered by the first nozzle among the first and second nozzles, wherein the printing adjustment unit is configured to move the seating part in the inner and outer directions of the main body, and wherein the roller is configured to move integrally with the seating part.

* * * * *